United States Patent [19]
Bertenshaw et al.

[11] Patent Number: 5,424,618
[45] Date of Patent: Jun. 13, 1995

[54] ARRANGEMENTS FOR REDUCING INTERFERENCE FROM A DIMMING SYSTEM, AND DIMMER THEREFOR

[76] Inventors: David R. Bertenshaw, 35 Ridgeway Close, Lightwater, Surrey GU18 5XX; Anthony R. Brown, "Westmead", 72 Bathurst Walk, Richings Park, Iver, Bucks SL0 9EG, both of England

[21] Appl. No.: 70,110

[22] Filed: May 28, 1993

[30] Foreign Application Priority Data

Jun. 4, 1992 [GB] United Kingdom ............... 9211879

[51] Int. Cl.⁶ .......................................... H05B 37/00
[52] U.S. Cl. ...................... 315/324; 315/362; 315/DIG. 4; 315/294; 315/302
[58] Field of Search ............ 315/291, 209 R, 362, 315/300, 302, 294, 242, 283, 352, 324, 316, DIG. 4

[56] References Cited

U.S. PATENT DOCUMENTS

| | | | |
|---|---|---|---|
| 3,816,797 | 6/1974 | Skirpan | 315/291 X |
| 4,053,813 | 10/1977 | Kornrumpf et al. | 315/283 X |
| 4,057,751 | 11/1977 | Bonsignore et al. | 315/316 |
| 4,095,139 | 4/1978 | Symonds et al. | 315/153 |
| 4,096,414 | 6/1978 | Howell | 315/291 |
| 4,633,161 | 12/1986 | Callahan et al. | 315/DIG. 7 X |

*Primary Examiner*—Robert J. Pascal
*Assistant Examiner*—Haissa Philogene
*Attorney, Agent, or Firm*—J. E. Brunton

[57] ABSTRACT

A lighting control system which comprises an AC mains power point, power distribution means coupled to the AC mains, a dimmer assembly comprising one or a plurality of co-located dimmer circuits each coupled to the distribution means to receive AC power therefrom, and each comprising an output port developing an AC power signal of frequency corresponding to the AC mains, each said dimmer circuit comprising a current path between the distribution means and the output port, a switching means located in the current path so as to controllably interrupt passage of current, switch driving means supplying a control signal to the switching means to cause it to interrupt the current path a multiplicity of times within each AC half cycle, and filtering means in the current path between the switching means and the output port arranged to smooth the current therethrough, the filtering means being arranged to attenuate current components at the frequency of operation of the switching means, and not substantially to attenuate current components at the frequency of the mains, the switch driving means being controllable to vary the duty factor of operation of the switching means, so as to provide at the output port a power signal at the mains frequency with an RMS amplitude related to the duty factor of the switching means; dimmer control means connected via a connection means to the switch driving means of each dimmer circuit to vary the duty factor thereof in accordance with a desired power output thereof; a power cable connected to each output port to enable one or many luminaire units to be supplied with power from a respective dimmer unit.

23 Claims, 20 Drawing Sheets

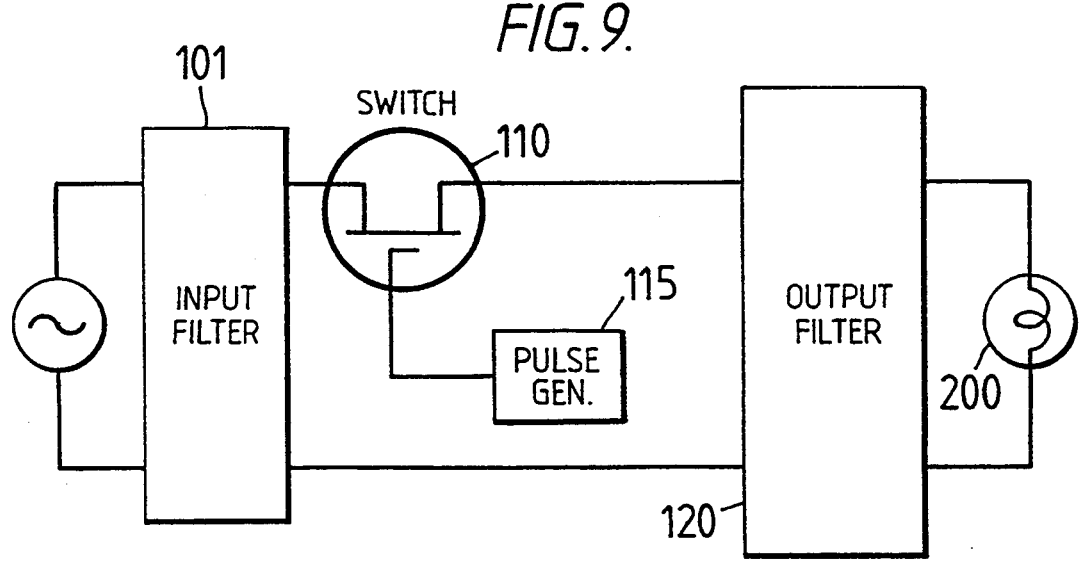
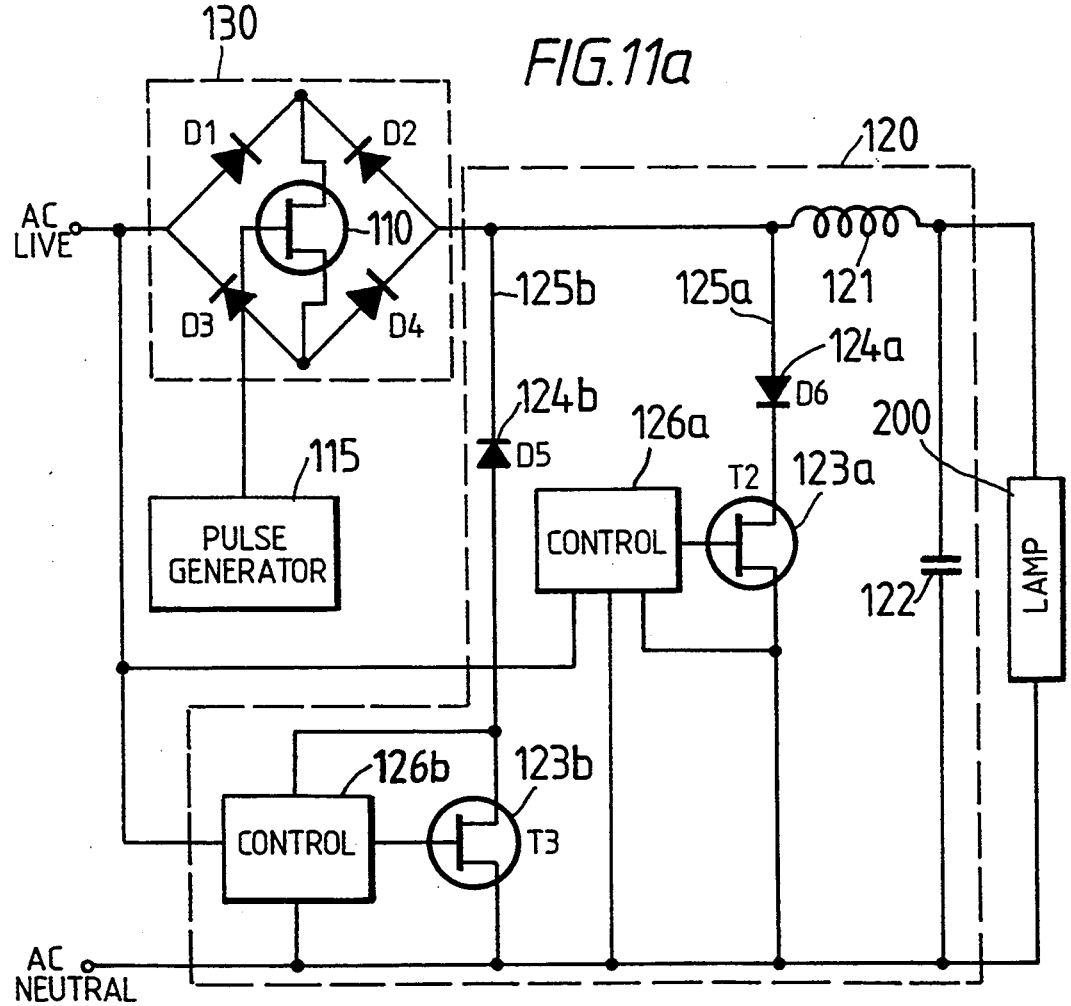

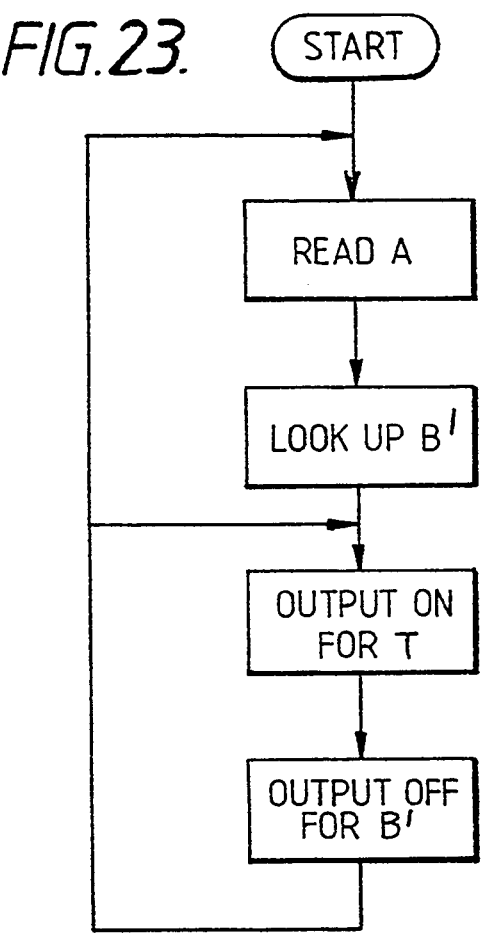

ARRANGEMENTS FOR REDUCING INTERFERENCE FROM A DIMMING SYSTEM, AND DIMMER THEREFOR

BACKGROUND OF THE INVENTION

1. Field of the Invention

This invention relates to a light dimming system for use in, for example, a theatre, or a television or film studio. This invention relates also to a dimmer suitable for, but not limited to, use in such a system.

2. Description of the Related Art

Television and film studios require high power light sources (often mobile) for selective illumination of particular characters, as do live entertainment venues such as theatres. It is necessary to be able to control the level of illumination, both to provide a constant predetermined level and for providing fade-in and fade-out effects. The control circuit for controlling the level of illumination is known as the "dimmer".

In the past, dimmers using autotransformers that is, transformers with a sweep connector to vary the number of turns on the secondary coil have been used. Typically, the AC mains supply would be connected to the primary coils of a bank of such transformers, each secondary coil being individually connected to a separate light. However, each transformer occupied considerable space and was cumbersome to use.

Alternative dimmer structures used variable resistors (reostats) which are smaller, but these generate considerable heat because of the high current through the resistance of the coils. A bank of such reostats therefore generated a large amount of heat, leading to the need for cooling, and to potential mechanical reliability problems.

In recent years, it has become known to use phase control as a method of controlling AC power. In phase control systems, a semiconductor switch switches the AC supply voltage on once each half-cycle. By controlling the timing at which the semiconductor element switches on, the proportion of the mains cycle gated through the semiconductor element, and hence the average power of the output, is controlled. The components of the phase control dimmer are relatively cheap, and do not involve mechanical movement. Further, the phase controlled dimmer is controllable from a low voltage source such as the output of a micro-computer, making it possible to digitally control the light level. Phase control dimmers have found application in power control in general, and in most lighting control applications. However, major problems arise in some applications. Because the semiconductor switch gates the AC mains supply voltage in a series of sharp steps, much of the power in the output is contained in harmonics of the mains frequency. The magnitude of the harmonics varies with the time of switching of the semiconductor switch (and hence the level of light) and the rate of rise of current flow (or the switching speed). The harmonics manifest themselves in two undesirable effects.

Firstly, electromagnetic interference is generated across a broad spectrum. Higher frequency components will be radiated outwardly of the dimmer and the load circuit, and could interfere with other electrical equipment nearby.

Secondly, where the lamp is an incandescent filament lamp, magnetomotive forces within the filament are caused, generating mechanical vibrations at harmonics of the mains frequency, and these mechanical vibrations are audible as "lamp sing"; they can also reduce the life of the filament.

Several approaches to reducing the magnitude of these effects have been proposed. In U.S. Pat. No. 3,691,404 and 4,287,468, and in a product marketed by Colortran, a dimmer is provided in which the AC cycle is switched once each cycle, rather than once each half-cycle. This reduces the magnitude of such effects, although it does not eliminate them. However, it leads inevitably to the introduction of a DC component in the output current, and can lead to the supersition of a DC voltage back onto the mains supply, which is unacceptable in many applications. Usually the rate of change in current flow is controlled by connection of a series inductor within the load circuit.

An alternative approach is proposed in U.S. Pat. No. 4,633,161 (equivalent to WO 86/01365, EP 85904329.1). In this approach, the operation of the semiconductor switch is controlled to provide a slow transition rather than a sharp step. This reduces the magnitude of the higher harmonics. However, during the slow transition the semiconductor switch dissipates considerable heat and consequently this approach is limited to approximately the same rate of change of current that a large inductor can achieve, unless large and expensive semiconductors switches and cooling means are used.

It is stated in U.S. Pat. No. 4,633,161 that the application of DC switched mode power supply operation (described for example in U.S. Pat. No. 4,450,384 and 4,885,508) to the control of incandescent lamp loads operating on AC services is obvious. However, no such application is known to have been attempted. Furthermore, U.S. Pat. No. 4,633,161 teaches that such a dimmer would be prohibitively expensive and unreliable.

There is therefore, as yet, no known or available solid-state dimmer which does not suffer to some extent from lamp sing when used with an incandescent lamp, or from excessive harmonic generation. In a live performance, these drawbacks may go unnoticed as there is generally a level of ambient noise present. However, in a studio this is often far from being the case. Firstly, studio lights are often close to the subjects of illumination. The acoustic noise from the lamp intrudes into the sound field of the subject and will be picked up by the microphone since sound stages have low ambient noise levels. In fact, microphones must often be placed close to the luminaires, generally suspended above the subject, to keep them out of sight of the cameras. This naturally increases the acoustic noise reaching the microphone. Further, the optical system associated with floodlights and scoop luminaires also acts to focus the lamp sing and direct it towards the subject, and the lamp housing itself often sympathetically vibrates and acts as a sounding board.

Further, as noted in "Lamp Acoustical Noise and the Reverse Phase Control Dimmer", Burkhart and Burtness, IEEE Trans. on Industry Applications, Vol.1A-8, No.1, January/February 1972, there is an increasing interest in placing the dimmers individually at the lamps which they dim, so as to reduce the heat problems associated with dimmer banks and to simplify the power distribution cabling. This industry trend is disclosed also in U.S. Pat. Nos. 4,366,161, 4,095,139 and U.S. Pat. No. 4,057,751. However, in a studio where the lamps are suspended from or near the ceiling, the dimmers will inevitably be close to other wiring passing at ceiling level and this may, as discussed above, include sound cables so that in addition to acoustic noise, the sound channels may be corrupted by electrical by coupled noise.

There is thus a need for a studio dimming system, for supplying power to incandescent lights from the AC mains, which can be used on sound stages without electrical and acoustic noise.

SUMMARY OF THE INVENTION

Accordingly, in one aspect, the present invention provides a studio dimming system which comprises an AC mains power point, power distribution means coupled to the AC mains, a dimmer assembly comprising a plurality of co-located dimmer circuits each coupled to the distribution means to receive AC power therefrom, and each comprising an output port developing an AC power signal of frequency corresponding to the AC mains, each said dimmer circuit comprising a current path between the distribution means and the output port, a switching means located in the current path so as to controllably interrupt passage of current, switch driving means supplying a control signal to the switching means to cause it to interrupt the current path a multiplicity of times within each AC half cycle, and filtering means in the current path between the switching means and the output port arranged to filter the current therethrough, the filtering means being arranged to attenuate current components at the frequency of operation of the switching means, and not substantially to attenuate current components at the frequency of the mains, the switch driving means being controllable to vary the duty factor of operation of the switching means, so as to provide at the output port a power signal at the mains frequency with an RMS voltage amplitude related to the duty factor of the switching means; dimmer control means connected via a communication link to the switch driving means of each dimmer circuit to vary the duty factor thereof in accordance with a desired power output thereof; the output port being provided to connect to a power cable running to one or more luminaire units to be supplied with power from a respective dimmer unit.

Furthermore, there is a need for an improved AC power control circuit (for example for use as a dimmer) usable in such an application. Accordingly, in another aspect the present invention provides a dimmer circuit comprising AC input terminals, AC output terminals, switching means arranged to interrupt the AC current path between the input terminals and the output terminals a multiplicity of times throughout an entire AC mains cycle, and switch driving means arranged to vary the average time for which the current path is interrupted, within each AC half cycle, and filtering means arranged to filter out current fluctuations of frequencies above the AC frequency, the variation of the average interruption time of the switching means being such as to change the shape of the AC voltage output waveform relative to the AC input waveform.

In one embodiment, the output wave form is changed to resemble the traditional prior art forward or reverse phase control wave form, in which the AC supply is gated off for a portion of each half cycle and on for the other portion, but with the effect of the relatively slow power transitions described in W086-01365, but avoiding the need for the substantial heat dissipation in the switch of the apparatus of W086-01365. In particularly preferred embodiments, the generation of harmonics is further reduced by avoiding second order discontinuities in the output voltage (i.e. abrupt changes of slope of voltage over time).

In another aspect, the invention provides a forward or reverse phase control dimmer with a relatively long transition in output power so as to reduce harmonic in generation, which the output wave form is controlled to avoid second derivative discontinuities.

In the described embodiments, forward phase control is preferred where the load to be supplied is inductive in nature, whereas reverse phase control is generally preferred where the load is predominantly resistive.

Other aspects of the invention are as described or claimed hereafter.

BRIEF DESCRIPTION OF THE DRAWINGS

The invention will now be described, by way of example only, with reference to the accompanying drawings, in which:

FIG. 9 illustrates schematically the elements of a dimmer according to the invention, and;

FIG. 11a shows in greater detail the structure of a dimmer of FIG. 9 in one embodiment of the invention, and;

FIG. 11c shows schematically an alternative structure to that of part of FIG. 11a;

FIG. 12(a–f) shows waveforms over time at points of FIG. 11a;

FIG. 23 is a flow diagram showing the operation of a digital pulse generator of FIG. 13*b* in an alternative embodiment to that of FIG. 14.

DESCRIPTION OF THE PREFERRED EMBODIMENTS

The Studio Environment

Figure 1:
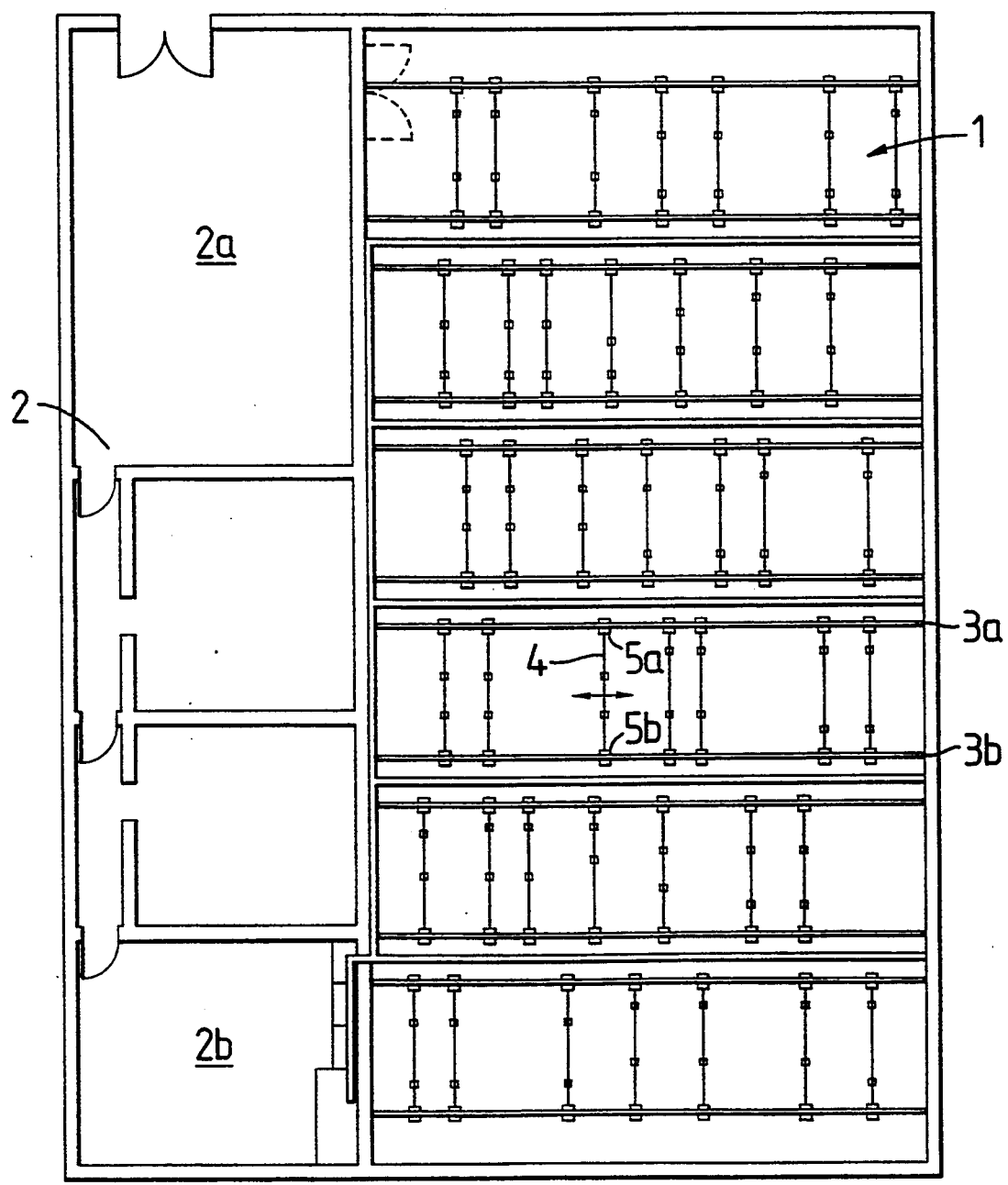
FIG. 1 shows schematically a plan view of a studio.

Referring to FIG. 1, one example of a typical studio comprises a stage area 1 in which the subjects to be filmed are located, and a back stage area 2 which is generally visually and audibly isolated from the stage area. The back stage area comprises, for example, a control room 2*a* in which the illumination controls are located and a technical equipment room 2*b* in which the power distribution point for distributing AC mains power to the illumination sources is located.

Running parallel across the ceiling are sets of tracks 3*a*, 3*b* and mounted to each set of tracks are a number of lamp supports (so-called "barrels") 4 each fitted with roller sets 5*a*,5*b* to allow rolling movement along the tracks 3*a*, 3*b*.

Figure 2:
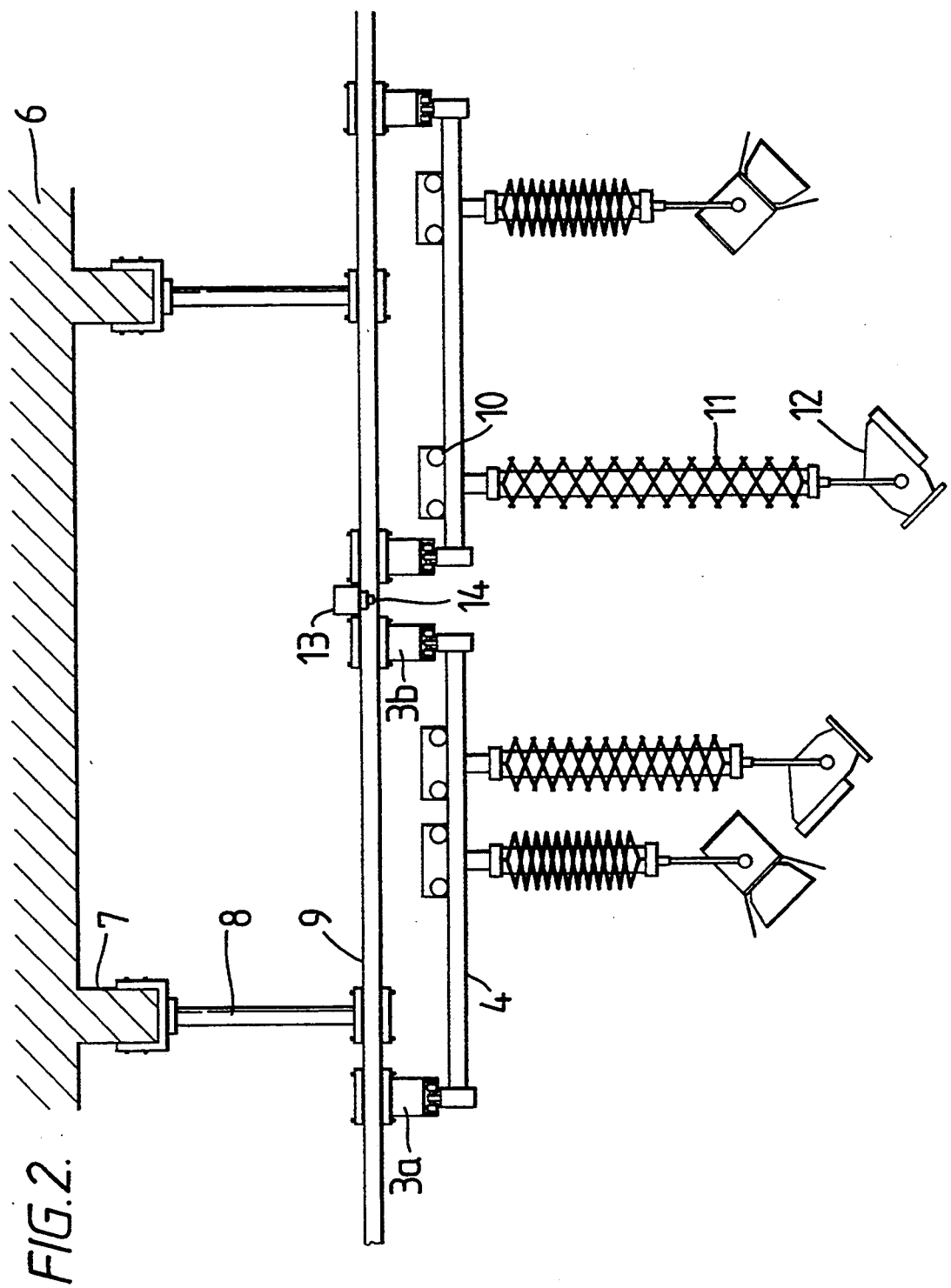
FIG. 2 shows schematically a side elevation through the roof area of the studio of FIG. 1.

Referring to FIG. 2, the studio ceiling 6 includes downwardly projecting concrete trusses 7 to which vertical and horizontal supporting beams 8, 9 are suspended. From the horizontal supporting beam 9, the parallel tracks 3*a*, 3*b* are suspended, within which the support beams 4 are arranged to run. The support beams 4 carry rollers 10 running along the beams, from some of which an extendable lamp suspension ("pantograph") 11 is provided, to permit height adjustment. Each pantograph 11 carries a lamp 12 in a swivel bracket. It is therefore possible to position the lamp 12 at a range of heights and lateral and longitudinal positions.

Electrical power is distributed through trunking 13 running parallel to the tracks 3, with sockets 14 into which a lamp is connected via a lead running through the suspension 11. Other systems may utilise motorised hoists, telescopes or a simple scaffold pipe grid. Typical details may be found at section 5 of "The Strand Book", Second Edition, available from Strand Lighting Limited.

Figure 3:
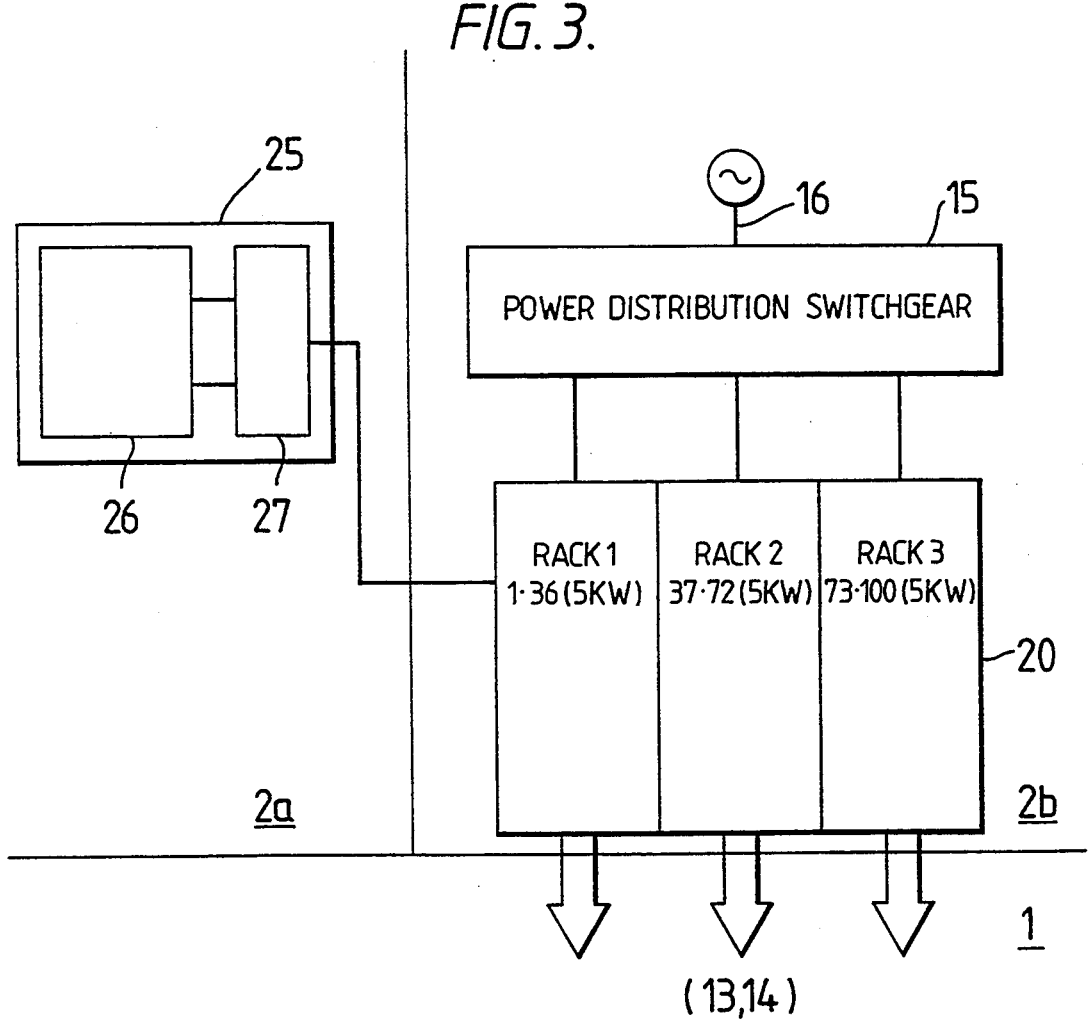
FIG. 3 shows schematically the electrical arrangement of equipment in a studio.

Referring to FIG. 3, the electrical arrangement of a studio lighting system comprises a lighting control unit comprises a switch gear unit 15, connected to an AC mains power intake 16.

The switch gear 15 distributes AC power to at least one rack 20 of dimmers; as shown, three racks each carrying typically 36 dimmer modules may be provided but, of course any desired number of racks and dimmers may be used. Each dimmer provides a voltage output along a cable running within a duct 13 to a socket 14 corresponding to that dimmer. The lamp 12 connected to the socket 14 is thereby controlled from a single dimmer in the rack 20.

The dimmers are controlled by control signals from a control unit 25 within the control room 2*a*, connected to the racks by control wiring. The control unit 25 typically consists of a manually operable control desk 26 comprising for example a plurality of sliders or a computer terminal, connected to a communications unit 27 for formatting the control information for communicating with the racks 20.

For example, the control unit may be the Galaxy 3 system available from Strand Lighting Limited. The switch gear is likewise conventional.

Dimmer Rack

Figure 4:
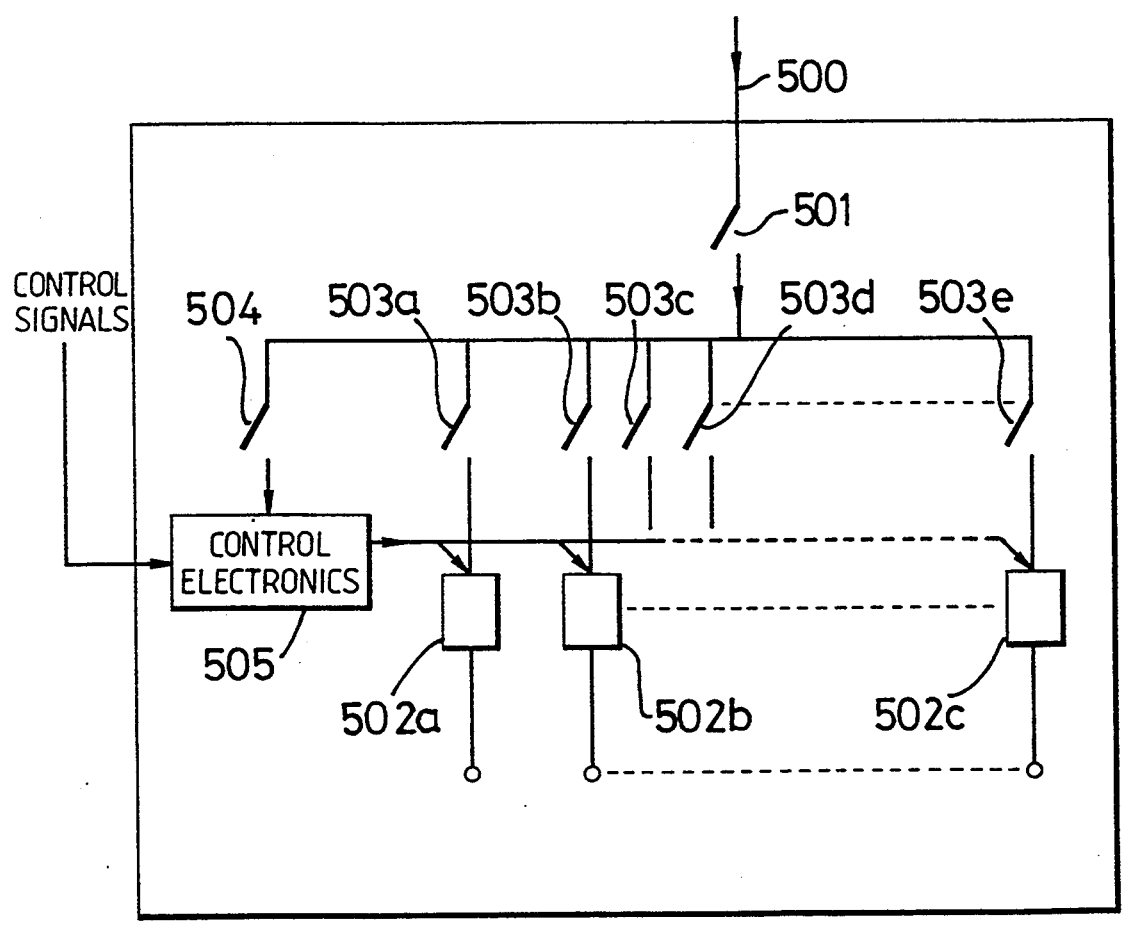
FIG. 4 shows schematically the structure of the dimmer rack forming part of FIG. 3.

Referring to FIG. 4, a dimmer rack for use in an aspect of the invention comprises a mains supply point 500, preferably a primary isolation circuit breaker 501, a plurality of dimmer circuits 502*a*–502*c* connected to the primary isolation point 501 via individual secondary circuit control breakers 503*a*–503*e*, and a control circuit 505 connected to the control cable from the control desk 25.

For example, the control signals may comprise digital words, for example transmitted as a series of bits, each word representing the intensity level for a given dimmer, the dimmer intensity levels being transmitted in time division multiplex form and the control electronics 505 may comprise a demultiplexer arranged to separate the signals and transmit a respective dimmer control word to each dimmer 502*a*–502*c* in serial form, parallel form or any other convenient form (for example as an analogue voltage).

The control unit 505 is likewise isolated via a secondary circuit breaker 504; the control electronics 505 may be provided as a suitably programmed microprocessor for example.

Dimmer

The structure of a dimmer according to an aspect of the invention will now be described in greater detail.

Figure 5A:
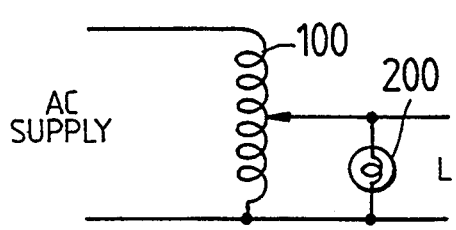
FIG. 5a indicates schematically the elements of a prior art dimmer.
Figure 5B:
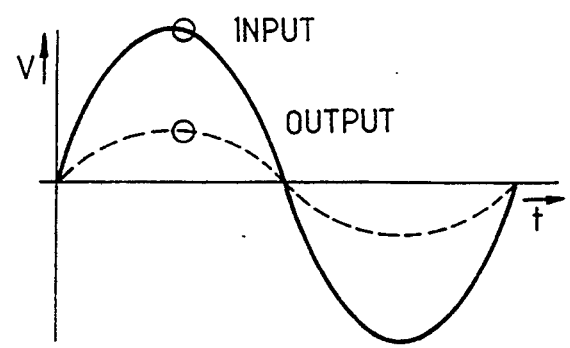
FIG. 5b indicates schematically the relationship between input and output voltage waveforms thereof.

Referring to FIG. 5*a*, when a conventional transformer 100 is tapped, the voltage across a lamp connected to the output is a fraction of the input voltage as shown in FIG. 5*b*. Likewise, the current through the lamp 200 is reduced relative to the current which would have flowed on application of the AC supply voltage. However, due to the positive temperature dependence of the resistance of the filament of the lamp, when a lower voltage is applied the lamp dissipates less heat and is consequently cooler, so that its resistance is lower and the current is raised to be somewhat more than the fraction of the maximum current corresponding to the ratio between the lamp voltage and the AC supply.

Figure 7A:
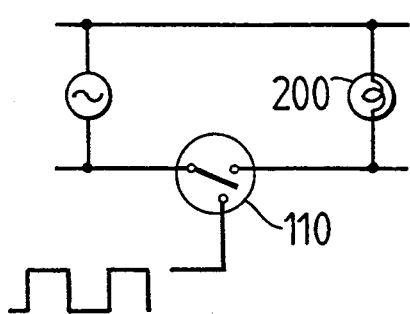
FIG. 7a indicates schematically the arrangement of a phase controlled dimmer.
Figure 7B:
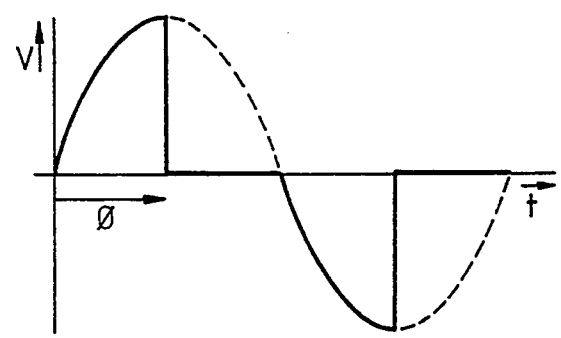
FIG. 7b shows schematically the input and output voltage waveforms thereof.
Figure 6:
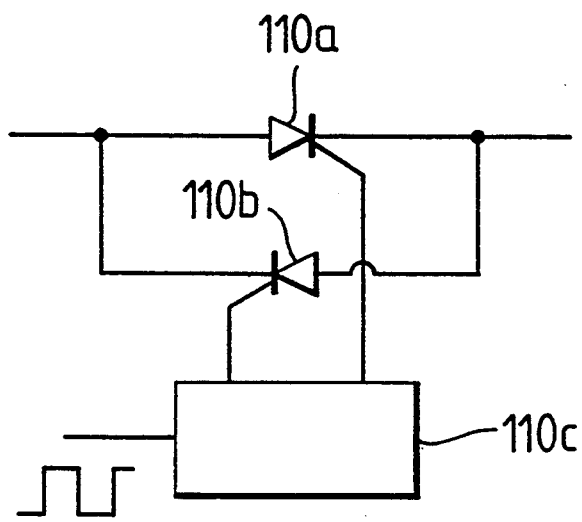
FIG. 6 illustrates schematically a switch element forming part of FIG. 5.
Figure 11B:
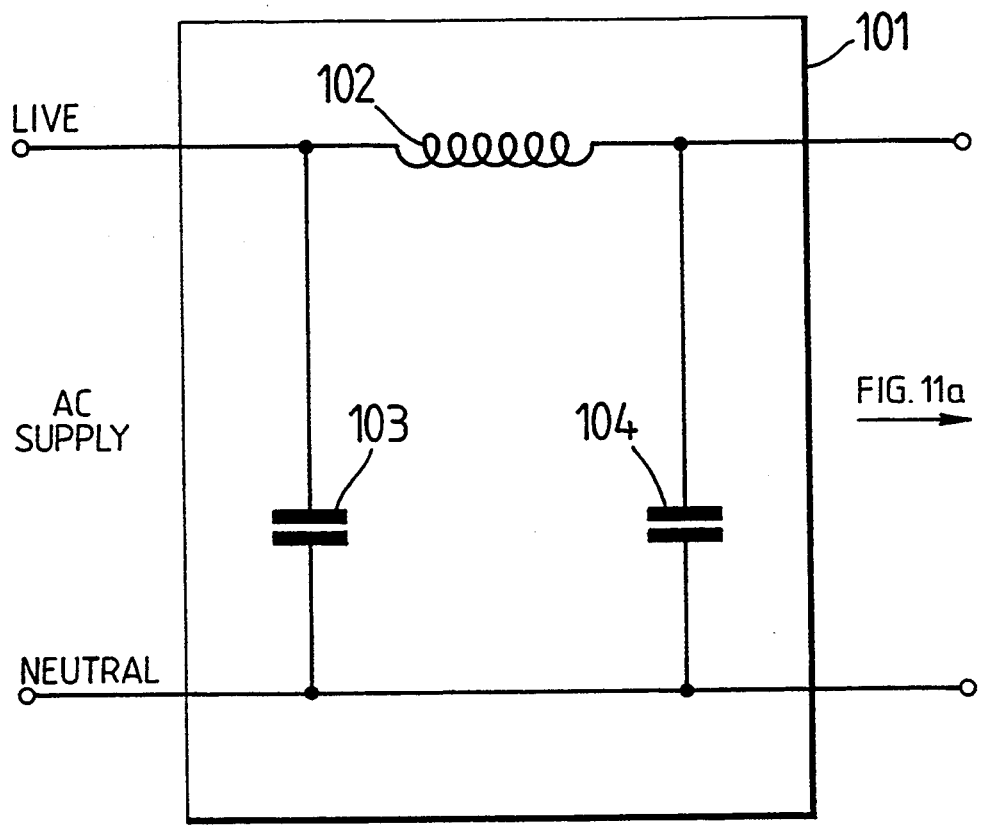
FIG. 11b shows in greater detail a further portion of the dimmer of FIG. 4 in one embodiment of the invention.
Figure 11C:
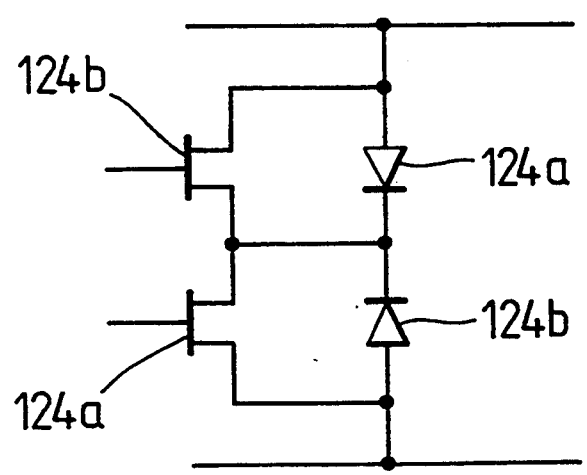

Referring to FIG. 7*a*, in a phase control dimmer the transformer 100 is replaced by a power semiconductor switch 110 (such as a pair of reverse-series MOSFET or IGBT transistors 124*a*, 125*b* in the arrangement shown in FIG. 11*c*), the control terminals of which are fed with a pulse train of a repetition frequency corresponding to twice the frequency of the AC main supply. For reverse phase control as illustrated in FIG. 7*b*, the start of each pulse is synchronised with the zero crossing of the AC main supply and the pulse length is selected to vary the power delivered to the load 200. Where the pulses are as long as a half cycle of the main supply, the switch 110 remains permanently on and the entire mains voltage is delivered to the load 200. Otherwise, as shown in FIG. 7*b*, only a proportion of each half cycle is passed and the average power is therefore reduced. The relation between the phase angle φ and the power delivered is described in, for example, our earlier UK applications numbers GB 2226898 and GB 2226431. In forward phase control, the switch 110 is held OFF after each zero crossing, for a predetermined pulse length, then switched ON until the end of the half cycle. In this case the switch 110 may be a pair of reverse parallel thyristors or silicon controlled rectifiers 110a or 110b as shown in FIG. 6.

Referring to FIG. 7B, the sharp step at the end (for reverse phase control) of the period for which the switch 110 is on is visible. The height of the step, and hence the power in the harmonics, depends upon the phase angle.

At a 90 degree phase angle (in other words a transition half way through the half cycle) around 16% of the total RMS current is carried in the harmonics, with 47% of the harmonic current in the third harmonics. International and Electrical Supply Authorities standards set harmonic current limits, such as IEC555-2 and UK Electricity Council recommendation G5-3; large dimmers may exceed these limits.

Figure 8A:
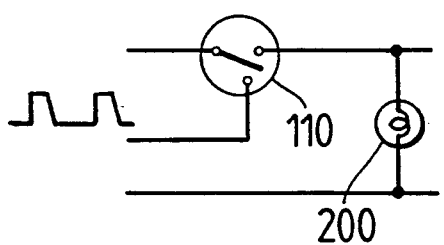
FIG. 8a indicates schematically the structure of a dimmer of the type of FIG. 7a when switched slowly.
Figure 8B:
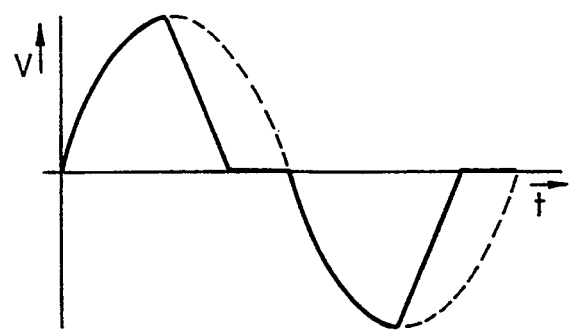
FIG. 8b correspondingly indicates the input and output voltage waveforms thereof.

Referring to FIG. 8a, the solution proposed in WO86/01365 is to provide that the switch 110 switches relatively slowly (in fact, the citation describes reverse phase control). As shown in FIG. 8b, the resulting transition in the voltage across the load is of finite slope, and consequently the power in the harmonics is reduced. However, the transistor switch 110 is now switching relatively slowly and during the switching time, considerable power is dissipated; the slower the transition, the more power is dissipated. In order to maintain power dissipation within sensible limits, the transition time needs therefore to be kept within limits at which substantial harmonics are still present.

In phase control dimmers, it is known to employ a series inductor to reduce harmonics, but the size, weight and voltage drop across an inductor is considerable if a good performance in reducing high frequency harmonic content responsible for lamp sing is desired (for example a 1 mS rise time). Furthermore, where a dimmer (for example a 5 kilowatt dimmer) whose filter has an acceptable rise time (for example, 1mS) is connected to a load of a lower rating (for example, 1 kilowatt), the rise time of the inductor is proportionately reduced and increased lamp sing can occur.

Referring to FIG. 9, according to the invention, the switch 110 is connected to the output of a pulse generator 115 generating rectangular pulses at a frequency much greater than the frequency of the AC mains (for example, 25-50 kHz). The output of the switch 110 is shown in FIG. 10c; the AC mains supply in FIG. 10a; and the output of the pulse generator 115 in FIG. 10B. The width of the pulses generated by the pulse generator 115 is controlled to control the power in the output of the switch 110, as in a phase control dimmer. A filter 120 comprising, for example, an inductor, filters the output of the switch 110 prior to supply to the load 200; the output of the filter 120 is shown in FIG. 10d. A filter 101 comprising, for example, an inductor filters the input AC and prevents interference caused by the high frequency switching from being fed back to the AC supply.

Although high frequency harmonics are present in the output of the switch 110, these now occur at much higher frequencies than in the prior art phase control dimmer; the smoothing filters 120, 101 (typically an inductive and capacitive filter) may therefore be physically smaller and cheaper than the large inductor needed for a phase control dimmer since its rise time may be much shorter.

Referring to FIG. 11a, the structure of the dimmer according to FIG. 9 will now be described in greater detail. The switch 110 comprises a unidirectional transistor such as a bi-polar high voltage transistor, for example. To allow for bidirectional current flow, the switch 110 is placed within a full wave rectifier bridge 130 connected to the AC mains live input line. During the positive half cycle of the AC mains, when the switch 110 is turned on, current flows through D1, 110, D4. During the negative going half cycle, when switch 110 is switched on, current flows through D3, 110, D2.

The output filter 120 comprises an inductor 121 in series with the output of the bridge 130 and a capacitor 122 between the output of the inductor 121 and the AC neutral terminal, provided in parallel across the lamp 200. A pair of back-to-back rectifying paths 125a, 125b are provided each comprising a rectifier 124a, 125b, the rectifiers operating in opposite directions, and a switch 123a, 123b. When the respective switch 123a or 123b is closed, the corresponding path 125a or 125b therefore acts as a unidirectional flyback path between the end of the inductor 121 and the AC neutral line.

The output filter 120 is employed to prevent radio frequency or other electrical interference. It is not essential to the dimming operation itself, since the pulse repetition frequency is generally high enough so that no audible magnetomotive effects in the filament are produced and no flicker is visible.

FIG. 11b shows the input filter 101 comprising a series inductor 102 in the AC live line, and parallel capacitors 103, 104 between the live and neutral lines, one either side of the conductor 102. The input filter 101 prevents corruption of the AC mains supply and reduces RF interference; it could, however, be dispensed with where a dedicated AC supply is provided. Also, a single input filter 101 could be positioned between the AC supply and a plurality of dimmer circuits (e.g. one filter per rack), but this is not preferred as switching noise from one dimmer could affect another unless each has a separate input filter 101.

It would be possible to provide an SCR in each path 125, rather than a separate rectifier and transistor. Another possible arrangement is shown in FIG. 11c.

Each of the transistor switches 123a, 123b is switched in over the desired half cycle by a corresponding control circuit 126a, 126b comprising a simple circuit for detecting the desired half cycle polarity and biasing the control terminal of the respective transistor on during that half cycle.

Instead of the bridge circuit 130 of FIG. 11a, a pair of transistors could be used, as shown, similarly to the arrangement of FIG. 11c. Such arrangements require fewer components, but the cost is higher.

The operation of the circuit of FIG. 11a will now be described with reference to FIG. 12. FIG. 12a shows the AC mains voltage across the input live and neutral terminals. FIG. 12b shows the output of the pulse generator 115, connected to the control terminal of the switch 110.

FIG. 12C shows the voltage applied to the control terminal of the switch 123A. FIG. 12D shows the voltage applied to the control terminal of the switch 123B. FIG. 12E shows the voltage at the output of the bridge 130, and the input of the inductor 121. FIG. 12F shows the voltage across the lamp 200.

Figure 12:
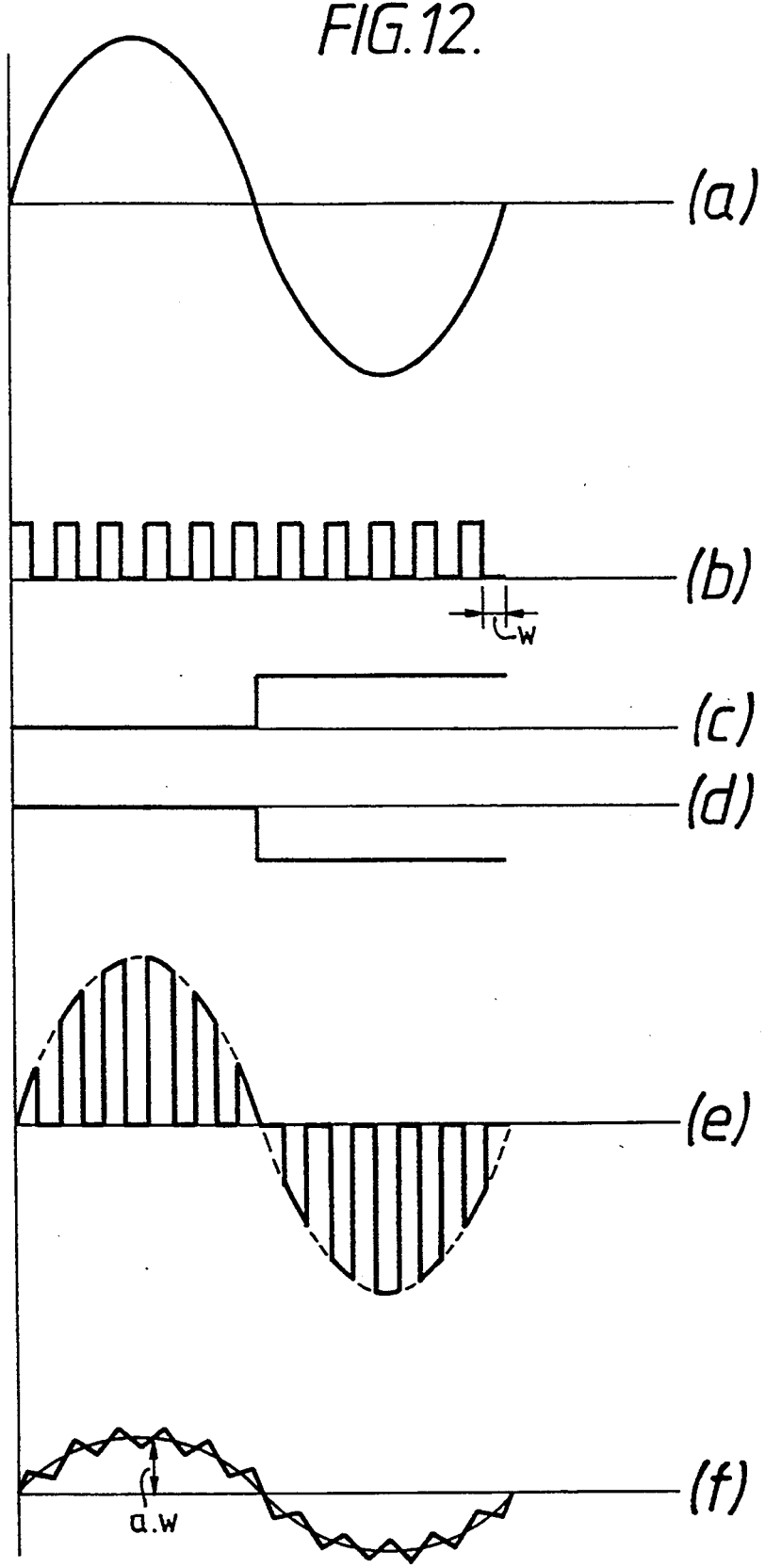

As shown in FIG. 12, the switch 110, within the bridge 130, operates to gate the incoming mains AC voltage so as to provide a series of sharp voltage pulses of the same width as the control pulses from the pulse generator 115. During the positive going mains half cycle, the path 125a is broken as the switch 123a is off. Whilst a pulse is present at the input to the inductor 121, the rectifier diode 125b acts to block current flow, and so the voltage is applied entirely to the inductor 121, increasing the current flowing in it.

The inductance of the inductor 121 is selected so that the current through the inductor 121 builds up whilst the voltage pulse is applied, and does not reach a steady state. The level of the current through the inductor 121 at the end of the voltage pulse, and the average level of current through the inductor 121, therefore depends upon the width of the pulse. The application of the voltage pulse also stores magnetic energy in the inductor 121. The mean current through the inductor 121 maintains the capacitor 122 at a voltage which depends upon the width of the voltage pulse, and the connected load.

At the end of the voltage pulse, the switch 110 opens so that the output of the bridge 130 is not connected to the AC live terminal. The inductor 121 is unidirectionally connected to the AC neutral terminal via the path 125b. The energy stored in the inductor 121 causes a continued current flow to the lamp 200, assisted by discharge of the capacitor 122, so that the voltage over the lamp 200 does not significantly drop until the switch 110 switches on again, generating the next voltage pulse.

As shown in FIG. 12f, the voltage over the load is therefore a substantially smooth sinusoidal signal with an amplitude monotonically related (e.g. proportional) to the width of the pulses produced by the pulse generator 115 and a small ripple dependent upon the inductance of 121, the capacitance of 122 and the frequency of pulses from the pulse generator 115.

The current flowing through the switch 110 is of comparable magnitude to that flowing through the lamp 200, but the former is in discontinuous pulses of higher current whereas the latter forms a continuous current of lower amplitude; the action of the filter 120 in storing and releasing energy provides that the power in the output sinusoidal signal is essentially the same as that in the gated signal from the switch 110 (excepting losses).

Figure 13A:
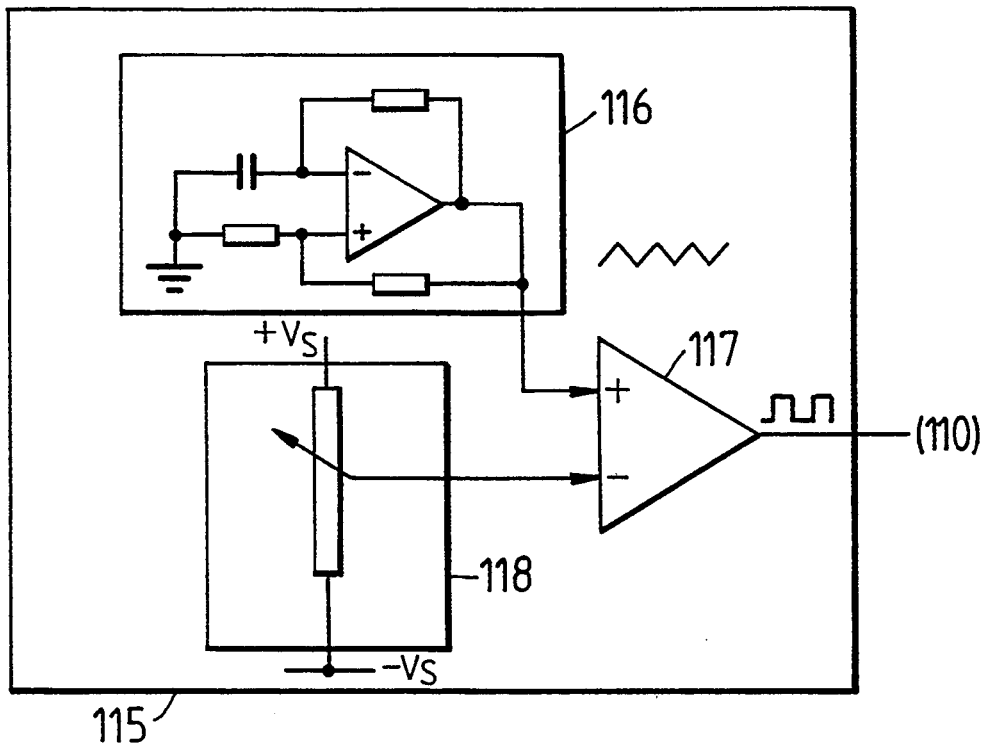
FIG. 13a shows an analogue pulse generator for use in FIGS. 9 or 11.

Referring to FIG. 13, the pulse generator 115 may be an analogue pulse width modulator as shown in FIG. 13A in which a free running triangular wave generator 116, such as a multi-vibrator, is connected to one input of a comparator 117, the other input of which is connected to a variable reference voltage source 118 such as a potentiometer connected across low voltage supply rails. To vary the power output of the dimmer, the operator varies the potentiometer slider; the higher the reference voltage, the smaller the width of the pulses output by the comparator 117, as a smaller proportion of each sawtooth generated by the generator 116 rises above the reference voltage from the potentiometer 118.

Where the dimmer is to operate in a rack as shown in FIG. 4, the variable reference voltage may be supplied from the control electronics 505, or could comprise a digital to analogue converter receiving a digital control word from the control electronics 505.

PWM controllers comprising single integrated circuits providing components 116 and 117 are known. In order to improve the stability against changing loads, a negative feedback system may be employed, measuring the output voltage and adjusting the PWM ratio to achieve the desired output.

Figure 14:
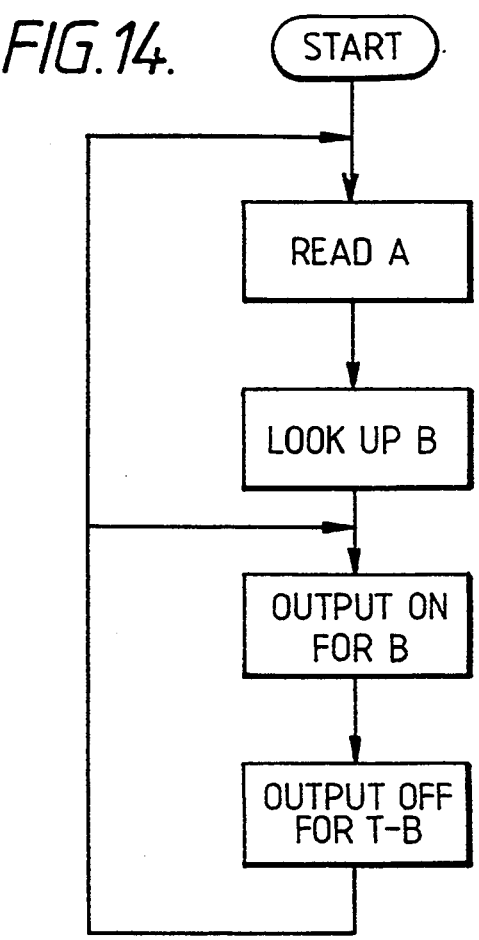
FIG. 14 is a flow diagram showing the operation of a digital pulse generator of FIG. 13b.

Preferably, however, the pulse generator 115 comprises a control unit 150 such as a microprocessor with a program storage read only memory (ROM), and may also comprise an analogue-to-digital converter 151 providing a signal input to the control unit 150 and a potentiometer 152 variable by the user to provide an analogue control signal. The value A of the analogue control signal is read, as shown in FIG. 14, by the control unit 150, via the ADC 151 and an output line of the control unit 150 is switched high for a time related to the value read. For example, an intensity value A may be converted to a pulse width value B via a look up table. The output line is then switched low for the remainder of the pulse repetition period T (the reciprocal of the pulse repetition frequency).

The control signal need not be read by the control unit 150 on every cycle, since the power will be varied slowly relative to the pulse repetition frequency.

The control unit 150 is preferably arranged also or alternatively to accept a digital control input, conveniently in serial form, for example from control electronics 505 in a rack of FIG. 4. This allows automatic control of the dimmer, for example for automatic fades. The analogue-to-digital converter 151 and analogue control potentiometer 152 may be unnecessary and hence not present in this case. Rather than vary the width of pulses at a constant pulse repetition frequency, it would be possible to keep a constant width and vary the repetition frequency (i.e. vary the inter-pulse spacing); in either case, the important consideration is the duty factor (i.e. the ratio of on time to off time) of the switch 110.

Referring to FIG. 23, in an alternative embodiment to that of FIG. 14 the duty factor of the pulse train output by the control circuit 115 is varied by keeping the widths of the pulses constant but varying the interval between pulses (and hence the pulse repetition frequency). Referring to FIG. 23, control unit 150 therefore reads a desired dimmer level from the input line, looks up an off time B' and employs the looked up time to set the duration for which the switch 110 is off, after switching the switch 110 on for a predetermined time T. The off times B' are inversely related to the desired dimmer level, and may be looked up in a look up table or directly calculated.

In this embodiment, the transition frequency between the pass band and stop band of the output filter 120 provides a limiting frequency; if the pulse repetition frequency falls to lie within the pass band of the output filter 120, the output filter will not operate to smooth the output waveform. In practice, however, in application to a dimmer for lights this is not a problem since the pulse repetition rate for average dimming levels will preferably be on the order of hundreds of kHz, and the transition frequency of the output filter 120 will be on the order of tens of kHz. The dimmer level corresponding to the minimum available pulse repetition frequency is therefore low enough to be substantially invisible to the human eye, and may therefore be treated as a zero level.

In the above described embodiment, the width of pulses output by the pulse generator 115 within each cycle of the AC mains was constant, and the output of the filter 120 was a sinusoidal waveform with an amplitude proportional to the duty factor of the pulses. In the following preferred embodiments, however, the pulse generator 115 is arranged to generate pulses of varying width within each cycle of the AC supply or, viewed in another way, it is arranged not to generate pulses of constant width throughout the cycle.

In one embodiment, the general arrangement of a slow transition phase control dinner proposed in WO86/01365 is improved upon as follows.

Figure 13B:
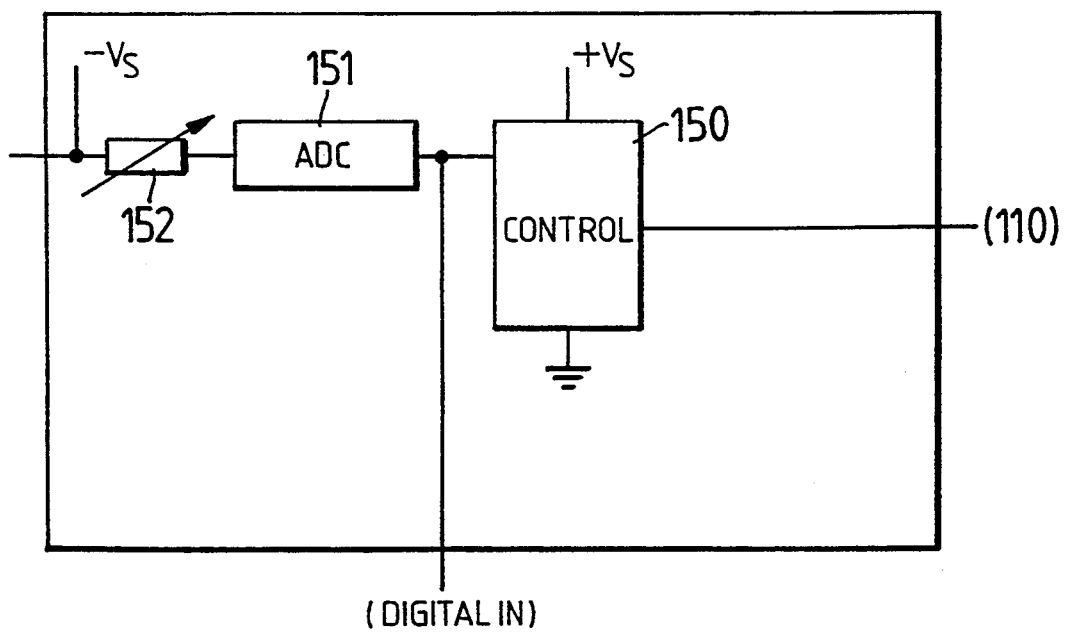
FIG. 13b shows a digital pulse generator for use in FIGS. 9 or 11.
Figure 15:
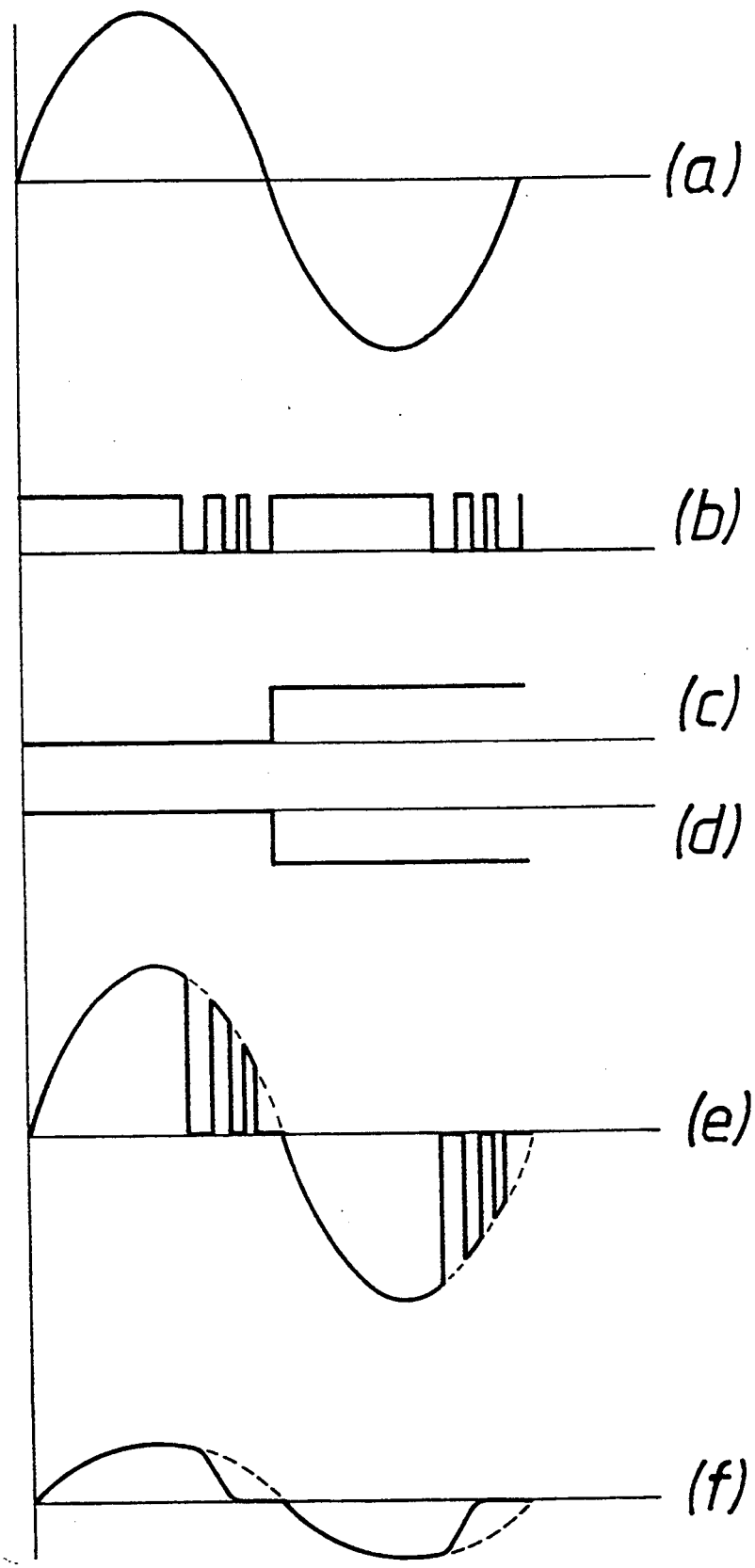
FIG. 15(a–f) corresponds to FIG. 12 and illustrates waveforms at points of the circuit of FIG. 11 when a different pulse generator is provided.

Referring to FIG. 15, which corresponds to FIG. 12, in the apparatus of FIGS. 11 and 13b the switch 110 is controlled to remain switched on for a period corresponding roughly to the conventional phase angle $\phi$ giving approximately the desired power output in a conventional phase controlled dimmer; the length of the first pulse produced by the pulse generator 115 is therefore, generally an appreciable fraction of the main cycle. To provide a transition reducing the high frequency harmonic content, the switch 110 is then energised with pulses of a progressively reducing duty factor. The power in the output of the bridge 130, as shown in FIG. 15e, is therefore progressively reduced so that when filtered by the filter 120 the effect is, as shown in FIG. 15f, to achieve progressive transition of the output voltage. Since the filter 120 conserves energy, this arrangement is, unlike that of WO86/01365, able to provide transitions of substantial width without significantly increasing power dissipation from the dimmer.

Figure 17:
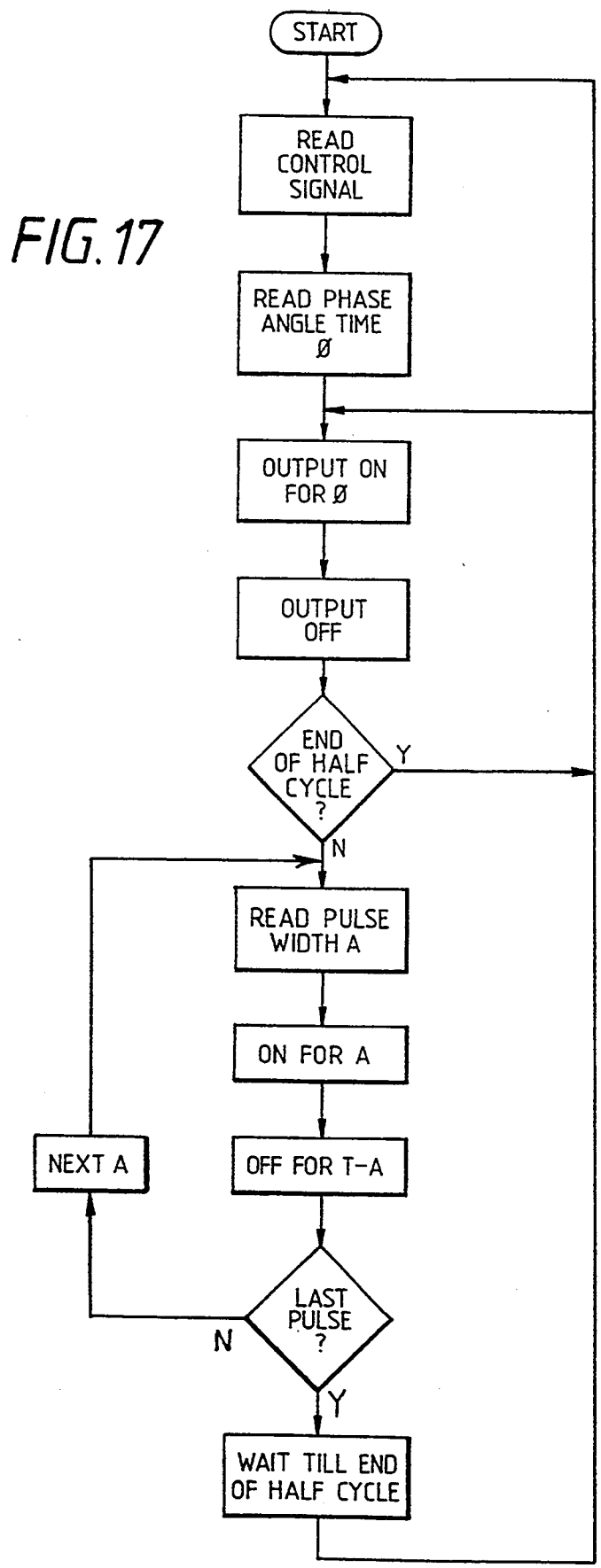
FIG. 17 is a flow diagram showing the operation of the pulse generator of FIG. 16.
Figure 21:
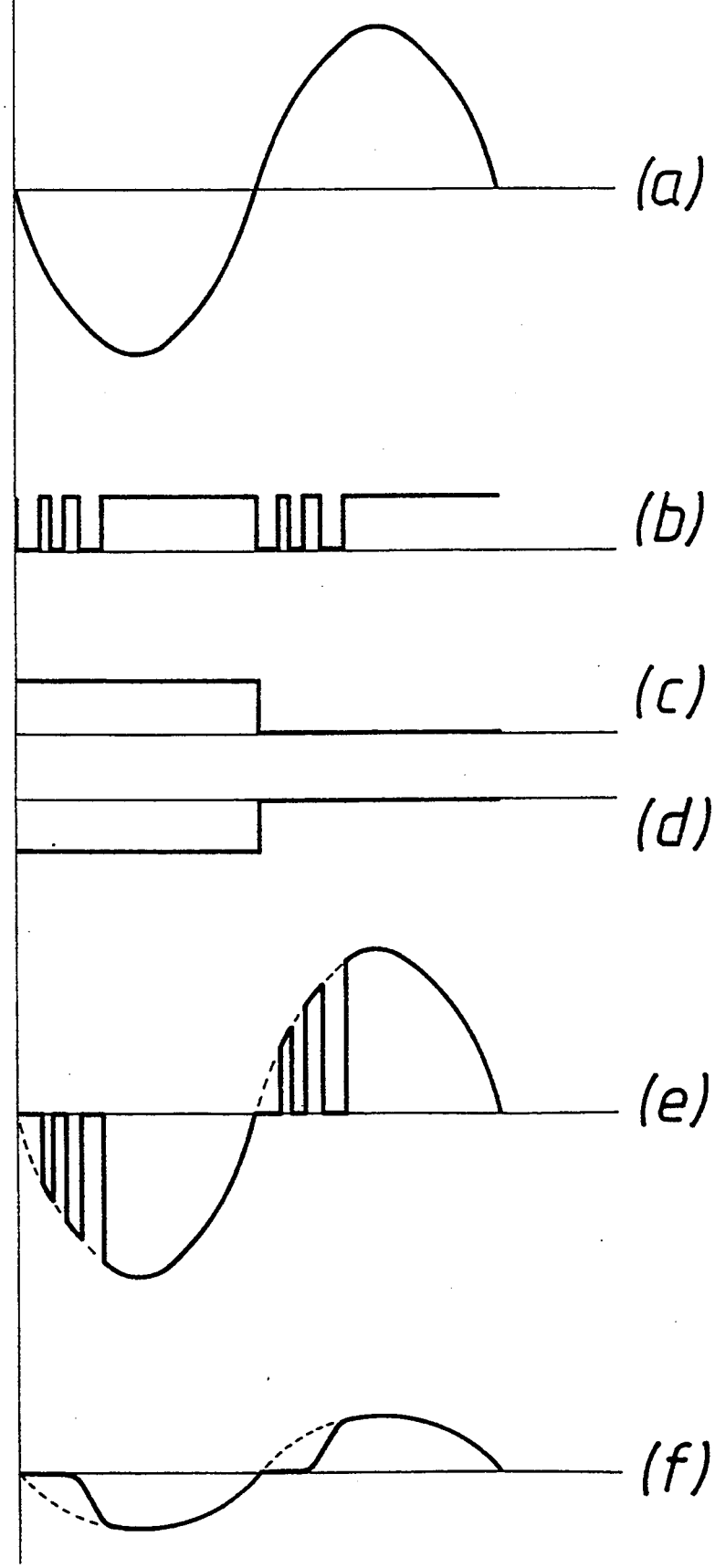
FIG. 21(*a–f*) corresponds to FIG. 15 and shows a reverse phase 1 waveform producible by the circuit of FIG. 11.

Although reverse phase control has been illustrated, the invention encompasses also forward phase control embodiments as illustrated in FIG. 21 (which corresponds to FIG. 15); the amendments to the process of FIG. 17 are obvious.

It will be realised that the scale of the width of the pulses has been exaggerated in FIG. 15, to aid understanding. In fact, the pulse repetition frequency would preferably be substantially higher. The period during which pulses are present may be smaller than the order of magnitude of the smallest increment of phase angle over which it is desired to control the power with the dimmer. This enables the use of the same set of pulse lengths or spacings (corresponding, for example, to a linear decrease over time of pulse width) to provide a transition at a wide range of phase angles. It would, however, of course be possible to provide a different set of pulse spacings for each phase angle.

Figure 16:
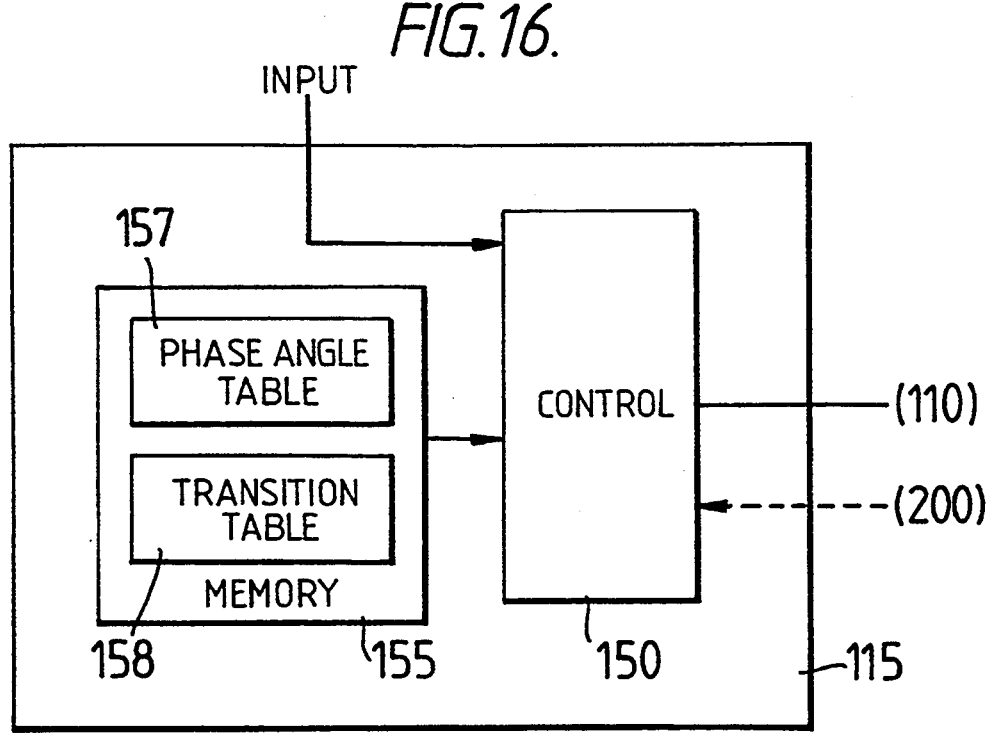
FIG. 16 shows a pulse generator suitable to produce the waveforms of FIG. 15.

Referring to FIG. 16, in this embodiment the pulse generator 115 comprises, in addition to the control unit 150, a memory device or devices 155 including a stored table of 158 transition pulse lengths and a stored table of phase angles 157.

The control unit 150 is arranged to read the control signal (as discussed above, preferably a digital signal) indicating the desired power level. The control unit 150 reads the corresponding phase angle for that power level from the phase angle table 157; the phase angles stored in the table 157 are generally slightly shorter than those in corresponding prior art dimmers since the dimmer also produces power during the controlled transition. The phase angles $\phi$ are conveniently stored as a number indicating an on time. The control unit 150 switches on its output line for a period corresponding to the phase angle $\phi$ for the desired power level, shown in FIG. 17. It then reads in turn the pulse widths for the progressively shorter transition pulses from the transition pulse width table 156 and, for each width read, brings its output line on for a period corresponding to the pulse width and then off for the remainder of the pulse repetition period. After the last transition pulse, the control unit 150 switches its output line off until the start of the next mains half cycle.

It will not be necessary to read the required power level at every main cycle, although this would of course be possible.

The shape of the transition is determined by the pulse widths stored in the transition pulse width table 156. A single table could be used for all phase angles, or a plurality of tables could be provided for different phase angle ranges; it would, of course, be possible to provide a transition table 156 for every phase angle increment, but this would require a large amount of memory. It would also be possible for the control unit 150 to calculate the required increments in real time.

The shape of the transition, as well as the length of the transition, plays a part in determining the harmonic content of the output signal over the lamp 200. The lengths of the pulses in the transition table 156 are preferably provided so that the transition is a smooth curve approximating a sine wave over the transition region, having a low frequency. The only harmonics are then due to the discontinuities at $n\pi/2$ phase angles. Suitable pulse width values can be derived readily by calculation or experiment.

The pulse timings required in this embodiment to achieve an approximately sinusoidal profile for any phase angle $\phi$ may require a plurality of different pulse timing tables 156, corresponding to different phase angle ranges; the process of FIG. 17 in this case is consequently modified to include a step of selecting a table 156 in dependence upon the value of $\phi$.

Rather than providing a phase angle table 157, and supplying the dimmer with a desired power level, the dimmer control unit 150 could be arranged to receive a phase angle directly from the control electronics 505.

Rather than employing a table 156 of pulse widths, the control unit 150 may of course be arranged to calculate the pulse widths in accordance with a stored algorithm.

Preferably, the dinner could be provided with a negative feedback line sensing the current and/or voltage to the load 200, as indicated in FIG. 16, and the width of the pulses could be controlled in dependence upon the sensed voltage level to provide the required transition times, (as described for example in our above referenced UK applications), to give greater stability against varying loads.

Likewise, in the embodiments of FIGS. 13a or 13b, a feedback path may be provided to set the pulse widths in accordance with the sensed output of the dimmer if required.

The above described apparatus may be used to solve a different technical problem as follows.

The positive temperature coefficient of resistance of the tungsten filament gives the filament lamp 200 a non-linear dependence upon average current energising the lamp. The resistance of the filament of a high powered tungsten halogen lamp at room temperature, for example, is only 6% that of the filament when operating at full power. The temperature of the filament depends upon the average current through the filament.

In a prior art phase controlled dimmer, when the dimmer is delivering full power the temperature of the filament and hence its resistance is high. If the dimmer now reduces the power to the lamp by gating the mains current at some angle so as to leave more than half of each half cycle intact, the average current through the filament is reduced initially. This reduces the temperature of the filament and consequently its resistance.

However, although the average current has been reduced the peak voltage produced by the dimmer is constant. Since the resistance of the filament is reduced, the peak current through the filament actually rises and so the peak current through the switching transistor of the dimmer likewise rises. This firstly means that the transistor needs to be rated for a high current. A second problem is that the filament lamp, when initially switched on, will have a low temperature and hence resistance. Some means of protecting against this surge may be provided, but this will tend to act against the artistic requirement in studios or theatres that the visual response time of the lamp at turn on is rapid.

Figure 18:
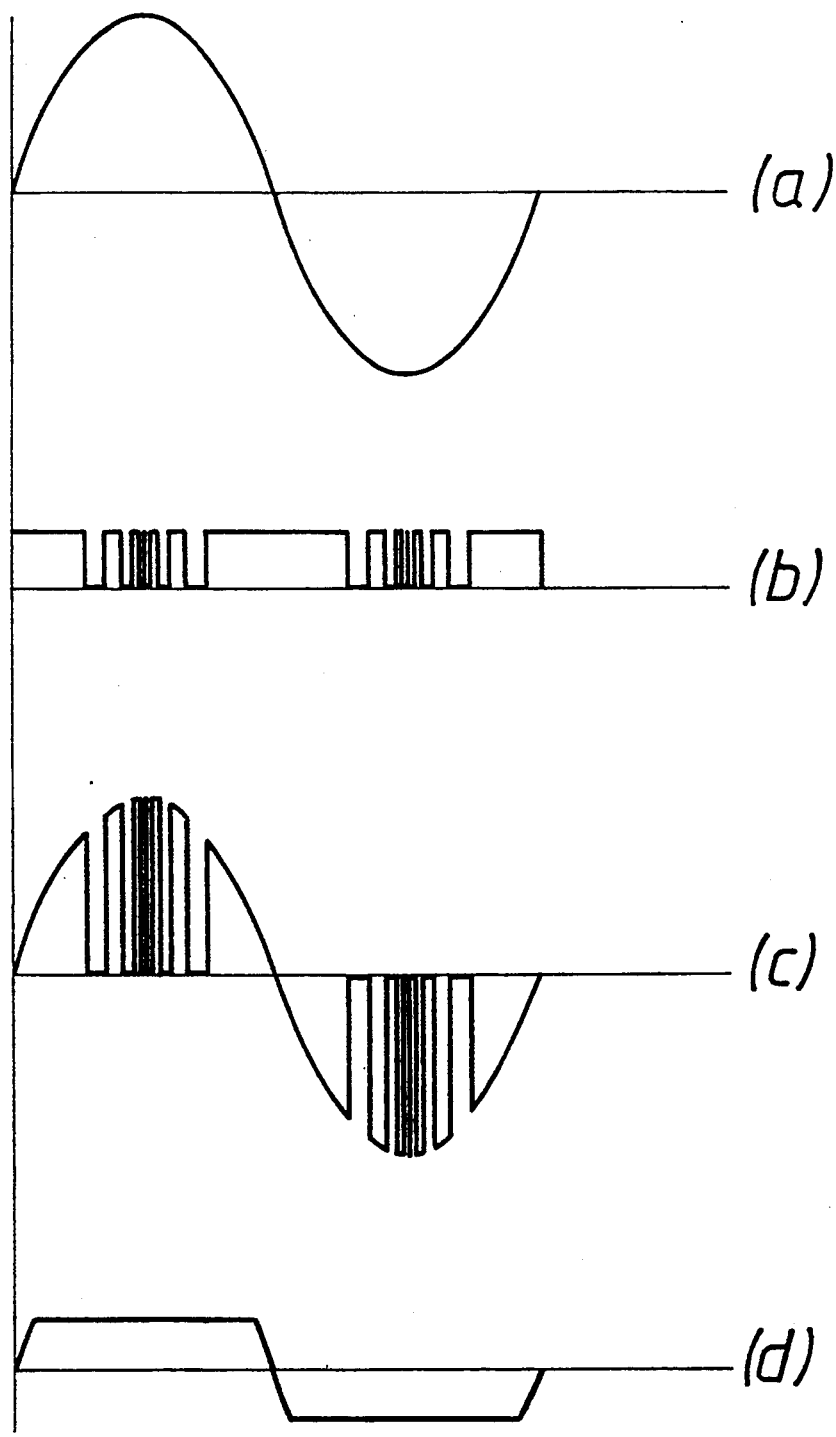
FIG. 18(*a–d*) corresponds to FIG. 10 and shows the waveforms over time generated by the circuit of FIGS. 9 or 11 operating in accordance with another embodiment of the invention.

Referring to FIG. 18, the above described apparatus may be employed to overcome this problem by providing that the duty factor of pulses applied to the transistor 110 is reduced towards the center of each half cycle, so that as shown in FIG. 18D the shape of the waveform after filtering by the filter 120 is no longer sinusoidal but is flattened. The peak voltage over the lamp 200, and hence the peak current through the lamp and through the switch 100, is therefore reduced whilst retaining much of the power in the output.

In this case, the pulse widths required to flatten the top of the waveform (i.e. to maintain the amplitude of the top of the waveform at a constant power) are variable so as to vary the duty factor from unity at the edges of the flat top to a minimum value at the 90° point of each half cycle, and then back to unity. The required pulse widths are derived by the requirement that, within each successive pulse repetition period W, the power of the waveform is constant. The power in each pulse period is the product of the height of each pulse (i.e. the mains voltage at the time of the current of the pulse) and the width of the pulse. Accordingly, since the pulse height varies sinusoidally over successive pulses the pulse width must vary as the reciprocal of the sine of the phase angle over successive pulses. In other words, since the power in each pulse i in the flat portion of the waveform is constant and equal to the length L of that pulse multiplied by the height of that pulse (given as a constant multiplied by sin(iW)), the length of the pulse L equals A/sin(iW), where the constant A is proportional to the maximum amplitude required and is consequently monotonically related to the required power output of the dimmer.

The pulse generator 115 in this embodiment can therefore store a table of pulse width values proportional to 1/sin(iW), and scale each width stored by a scaling factor derived from the power level set for the dimmer. Alternatively, current sensing could be provided to sense the current through the load, and the pulse generator 115 may variably scale the pulse durations until the current through the load matches the desired dinner current profile.

Equally, however, the pulse generator 115 could comprise a microcomputer or microprocessor arranged to calculate pulse durations in accordance with a stored program sequence.

By providing high current which is constant for a substantial portion of each half cycle, the peak current requirement for any required RMS current is reduced relative to that of a sinusoidal signal, which allows the choice of a lower peak current rated switch 110. Further, since the rising and falling portions of the lamp voltage waveform are substantially the original mains sinusoidal waveform, the rise and fall times are substantial and the rates of rise and fall are low, reducing lamp sing.

Figure 10:
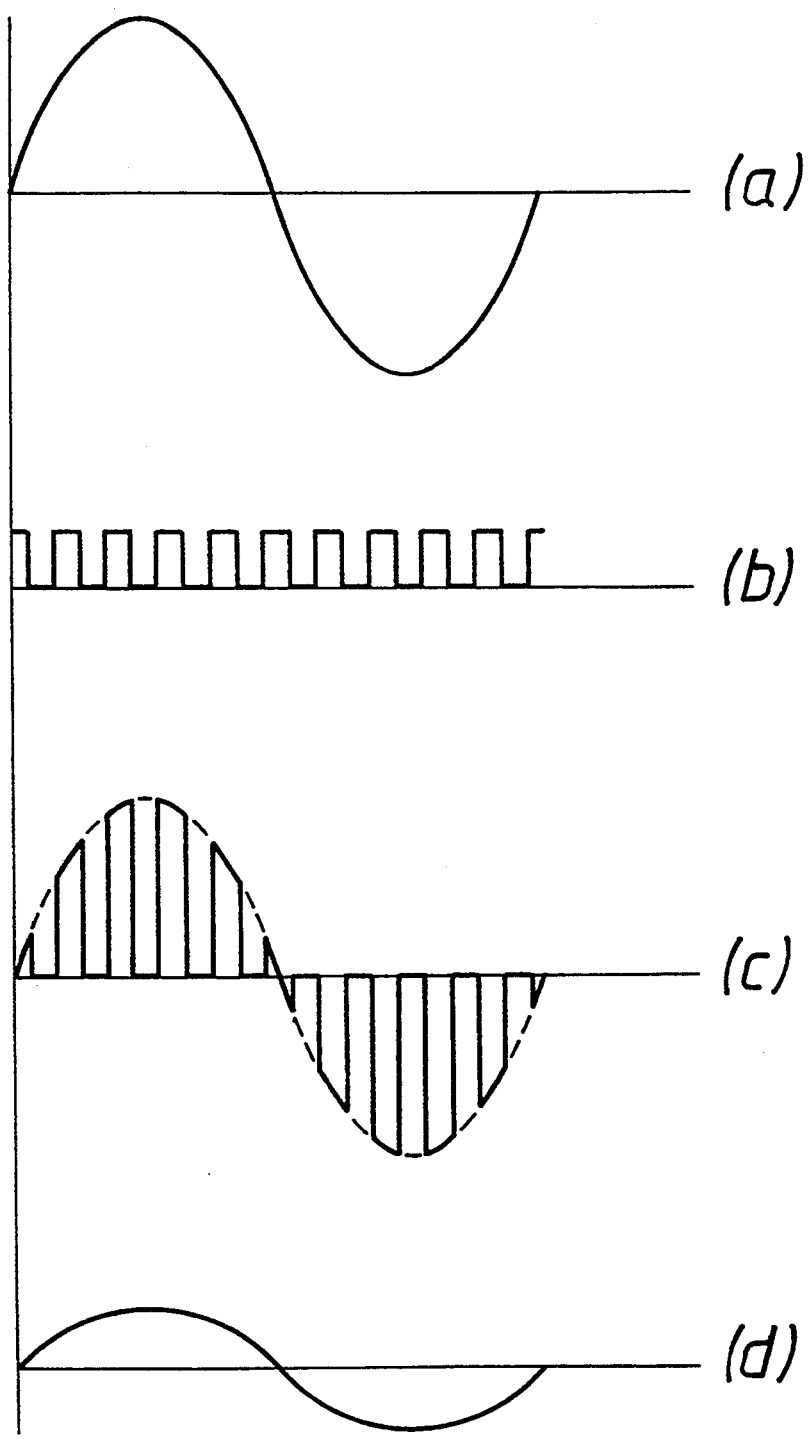
FIG. 10(a–d) illustrates schematically signals at points thereof.
Figure 19:
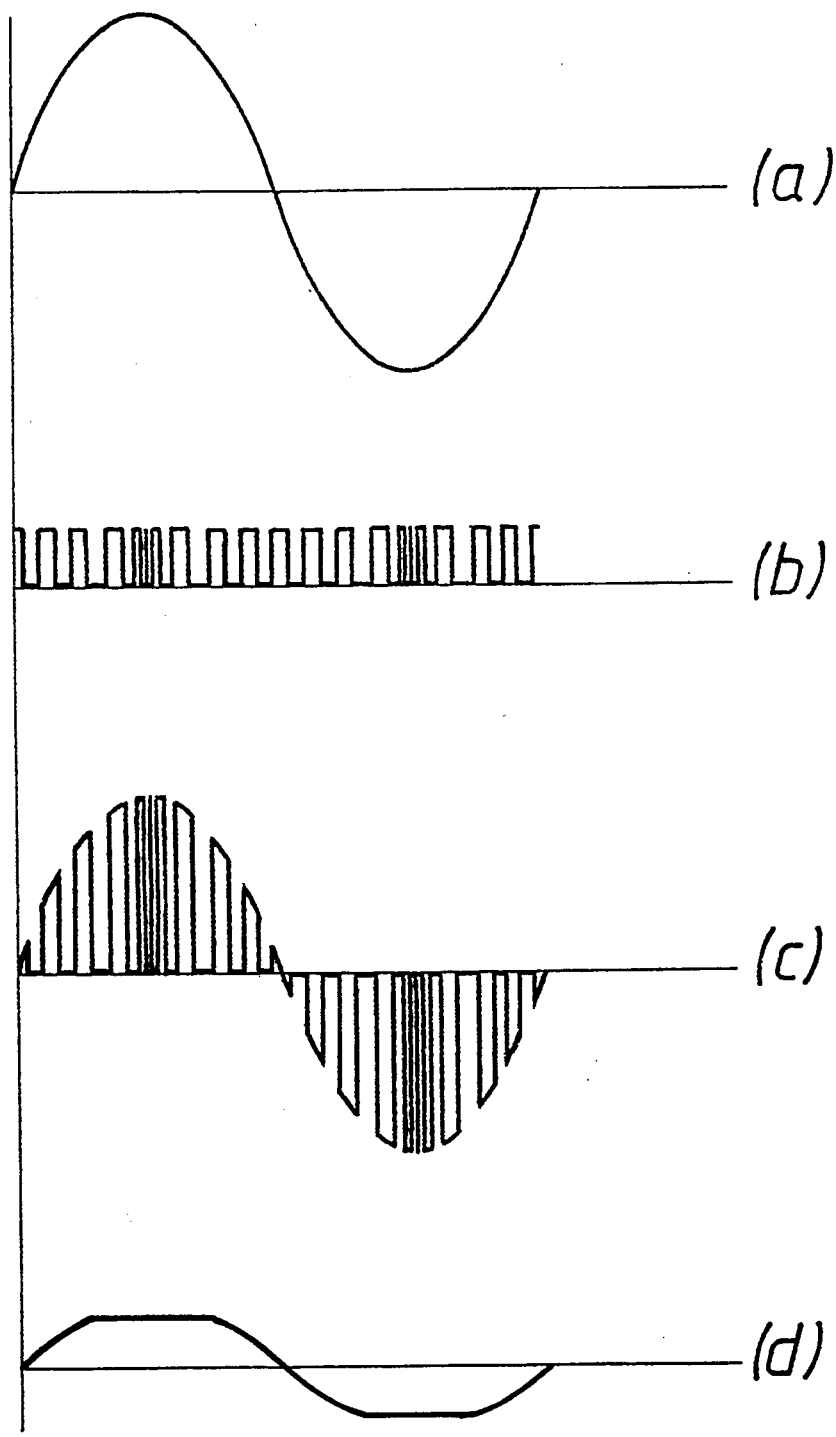
FIG. 19(*a–d*) corresponds to FIG. 18 in a yet further embodiment of the invention.

This embodiment of the invention could, of course, be combined with the embodiment illustrated in FIG. 10, so that the initial rising and falling parts of the mains supply could be interrupted if desired to further reduce the lamp power. Where this is not done, as in FIG. 18, the rise and fall times vary with the power through the lamp, in accordance with the varying peak current level, since the slopes of the rise and fall parts of the waveform are not significantly altered. However, a further reduction in harmonic content, and hence lamp sing can be achieved, as shown in FIG. 19, by providing that the rise and fall portions of the waveform are also interrupted, to vary the slope of the rise and fall paths of the waveform through the lamp. In this way, the rise and fall times can be kept substantially constant, and relatively long, for different power levels; the set of pulse widths illustrated schematically in FIG. 19b therefore need only be scaled by a constant to vary the power through the lamp while maintaining substantially constant rise and fall times.

Thus, the pulse widths during the rising and falling paths of the waveform may be substantially constant, corresponding to FIG. 10b, and those during the peak portion inversely sinusoidal as shown in FIG. 18b.

Figure 20:
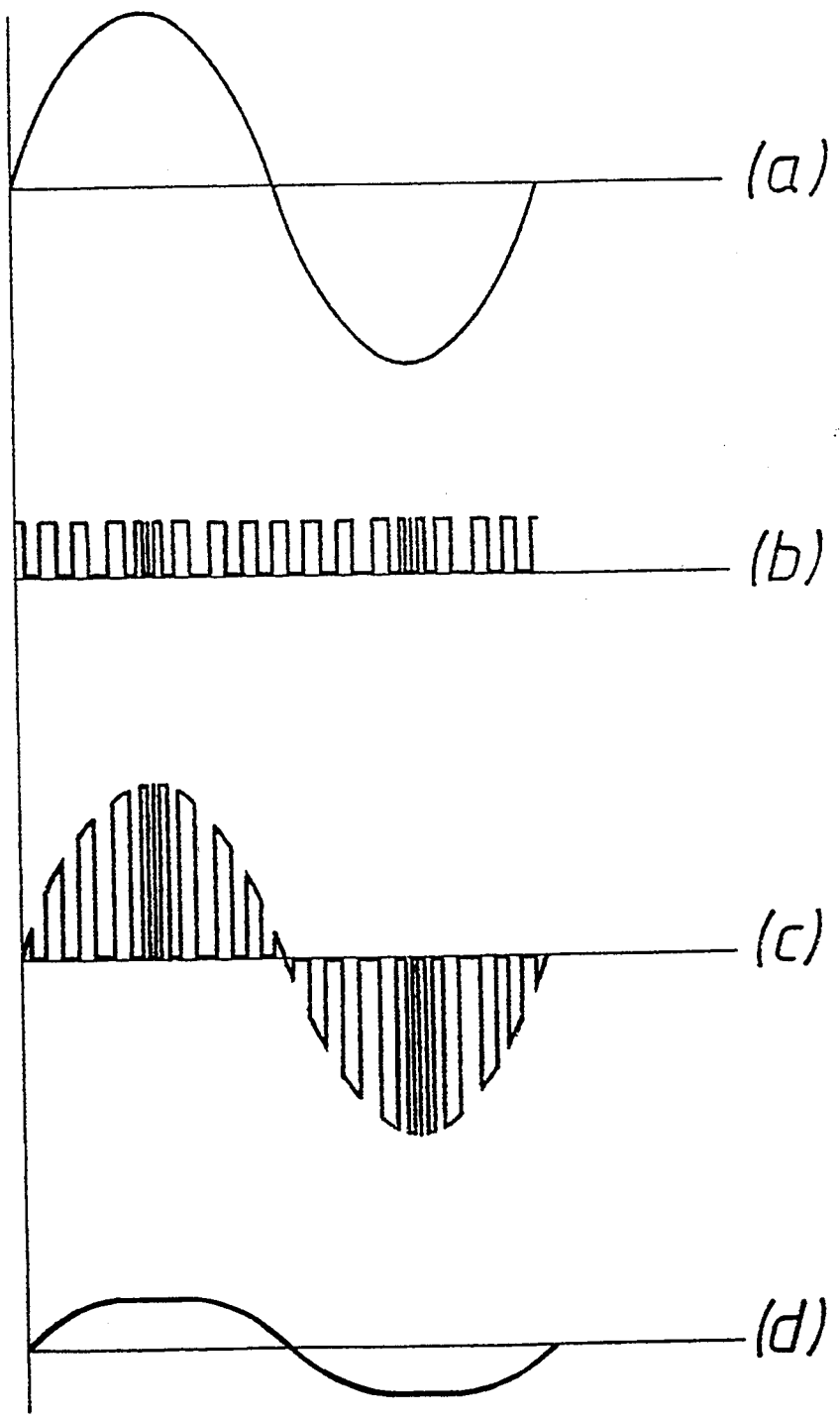
FIG. 20(*a–d*) corresponds to FIG. 19 in a yet a further embodiment of the invention.

In FIG. 19d, there will be seen to be a slope discontinuity between the rising and falling portions of the waveform and the constant amplitude central portion of each half cycle. These slope changes give rise to some harmonic generation, although of reduced amplitude compared to signal magnitude changes. The change of slope can be eliminated by providing that the pulse widths of pulses in the region of the transition are smooth in second derivative of width across the transition. As shown in FIG. 20, the effect is to eliminate the slope discontinuity and thereby further reduce the harmonics generated.

Figure 22A:
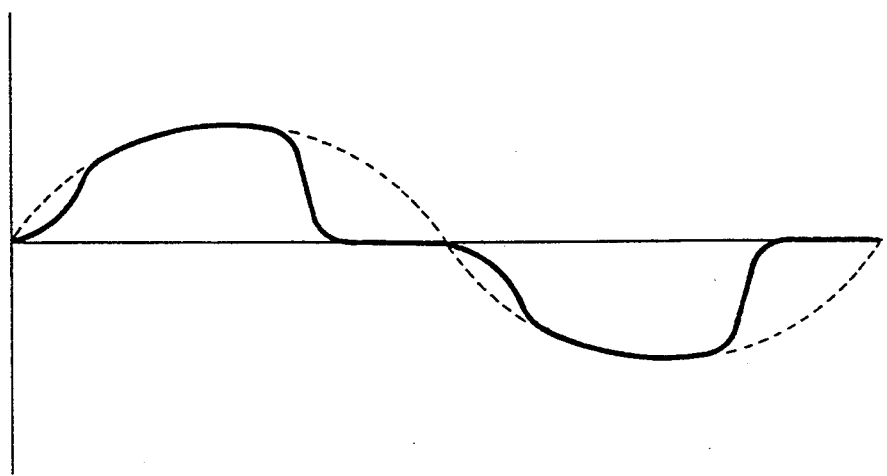
FIG. 22*a* corresponds to FIG. 15(*f*) and shows a waveform produced preferred forward phase embodiment.
Figure 22B:
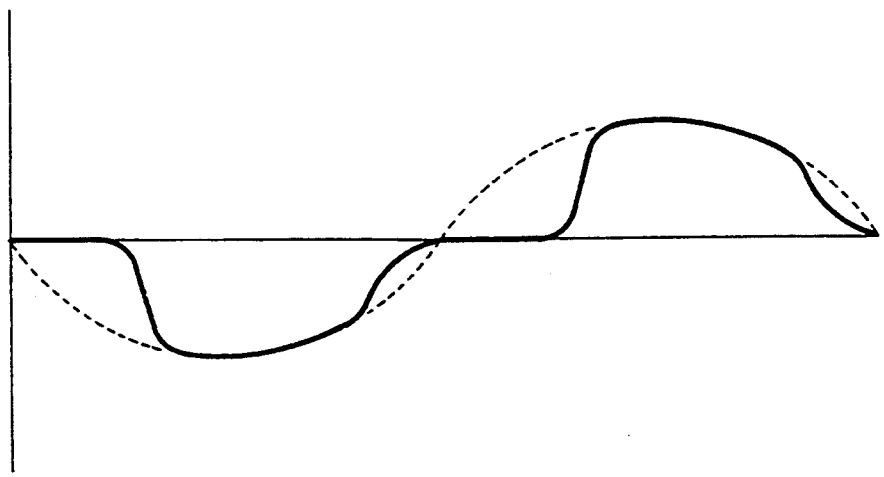
FIG. 22*b* corresponds to FIG. 21(*f*) and shows a wave form produced in a preferred reverse phase embodiment.

This principle of avoiding slope discontinuities can also be employed in the embodiments of FIGS. 15 and 21 since the start of each half cycle ordinarily involves a transition between a zero first derivative and a steeply sloping half cycle end or beginning. Accordingly, referring to FIG. 22a, in a preferred reverse phase control embodiment corresponding to FIG. 15, the initial part of each half cycle is pulse-width modulated to provide a smooth slope progression, avoiding sharp slope discontinuities around 0°, 180° phase angles. Likewise, a preferred corresponding forward phase control wave form corresponding is illustrated in FIG. 22b. This improved phase control technique in which slope discontinuities are avoided could in principle be employed using other technologies (for example that of WO 86/01365).

The above described dimmer circuits are, in a preferred aspect of the invention, provided as plug in modules suitable for fitment into a rack of the type shown in FIG. 4. Despite the trend towards providing dimmers at each luminaire, we have realised that providing dimmers of the above type in a rack has the following advantages:

1. It is easier to shield any RF interference generated by the higher frequency operation of the switch 110.
2. The higher frequency operation of the switch is physically separated from microphones, cameras and other audio and video equipment in the studio space.
3. The generation of heat, which remains a significant problem with the above described prior art dimmers or with dimmers of the type shown in WO86/01365 is reduced when a number of dimmers are co-located, since efficient cooling and forced ventilation is practical.

Additionally, the dimmer circuits may be arranged to advantageously share components; for example, low voltage DC power supplies for the control units 150, microprocessors and other components, or shared memories for phase angle or pulse widths. A single high speed pulse width control unit might be multiplexed to control a plurality of different dimmer circuits, rather than providing a separate pulse generator for each. Many other variations will be apparent to the skilled person.

However, the above embodiments could also be used individually as dimmers, not only in studio, or theatre applications but also in, for example, architectural lighting applications. Other applications than lighting might also be possible.

We claim:

1. A studio lighting control system which comprises an AC mains power point, power distribution means coupled to the AC mains, a dimmer assembly comprising a plurality of co-located dimmer circuits each coupled to the distribution means to receive AC power therefrom, and each comprising an output port developing an AC power signal of frequency corresponding to the AC mains, each said dimmer circuit comprising a current path between the distribution means and the output port, a switching means located in the current path so as to controllably interrupt passage of current, switch driving means supplying a control signal to the switching means to cause it to interrupt the current path a multiplicity of times within each AC half cycle, output filtering means in the current path between the switching means and the output port arranged to smooth the current therethrough, the output filtering means being arranged to attenuate current components at or above the frequency of operation of the switching means, and not substantially to attenuate current components at the frequency of the mains; input filtering means in the current path from the AC mains to each dimmer circuit, arranged to attenuate current components at or above the frequency of the switch means; the switch driving means being controllable to vary the duty factor of operation of the switching means, so as to provide at the output port a voltage signal at the mains frequency with an RMS amplitude related to the duty factor of the switching means; and dimmer control means connected via a connection means to the switch driving means of each dimmer circuit to vary the duty factor thereof in accordance with a desired voltage output thereof; the output port being for connection to a power cable running to one or more luminaire units to be supplied with power from each dimmer unit.

2. A system according to claim 1, in which the switch driving means is arranged to vary the duty cycle within each half cycle of the mains, so as to generate a non-sinusoidal output power signal.

3. A dimmer assembly comprising AC input terminals, AC output terminals, switching means arranged to interrupt the AC current path between the input terminals and the output terminals a multiplicity of times throughout an entire AC half mains cycle, switch driving means arranged to vary the average time for which the current path is interrupted within each AC half cycle, the variation of the average interruption time of the switching means being such as to change the shape of the AC output waveform relative to the AC input waveform.

4. A dimmer assembly according to claim 3 in which the interrupting means is arranged to allow the passage of current for a multiplicity of pulses in each half cycle.

5. A dimmer assembly comprising AC input terminals, AC output terminals, switching means arranged to interrupt the AC current path between the input terminals and the output terminals a multiplicity of times throughout an entire AC half mains cycle, switch driving means arranged to vary the average time for which the current path is interrupted within each AC half cycle, the variation of the average interruption time of the switching means being such as to change the shape of the AC output waveform relative to the AC input waveform, said shape of the AC output wave form being substantially the same as that of the AC input wave form over one portion of each half cycle and being substantially different over another portion.

6. An assembly according to claim 5 in which one of the two portions includes a portion of substantially zero amplitude.

7. A dimmer assembly according to claim 5, wherein said another portion corresponds to a period encompassing the amplitude peak of the half cycle at the input terminals, and the average interruption time of the switching means progressively increases towards the amplitude peak of the input wave form, so that the wave form at the output terminal has a lower peak amplitude than would a wave form of the same RMS voltage having the shape of that at the AC input terminals.

8. A dimmer assembly comprising AC input terminals, AC output terminals, switching means arranged to interrupt the AC current path between the input terminals and the output terminals a multiplicity of times throughout an entire AC half mains cycle, switch driving means arranged to vary the average time for which the current path is interrupted within each AC half cycle, the variation of the average interruption time of the switching means being such as to change the shape of the AC output waveform relative to the AC input waveform, said current being uninterrupted for a portion of each half cycle.

9. A dimmer assembly comprising AC input terminals, AC output terminals, switching means arranged to interrupt the AC current path between the input terminals and the output terminals a multiplicity of times throughout an entire AC half mains cycle, switch driving means arranged to vary the average time for which the current path is interrupted within each AC half cycle, the variation of the average interruption time of the switching means being such as to change the shape of the AC output waveform relative to the AC input waveform, said switching means being arranged to allow the passage of current for a multiplicity of pulses in each half cycle, said pulses being either of a constant repetition frequency and of variable width within each half cycle or of constant width and of variable repetition frequency within each half cycle.

10. A dimmer assembly according to claim 9 in which the pulses in the first portion are adjoining so that the current is uninterrupted during that portion.

11. A dimmer assembly comprising AC input terminals, AC output terminals, switching means arranged to interrupt the AC current path between the input terminals and the output terminals a multiplicity of times throughout an entire AC half mains cycle, switch driving means arranged to vary the average time for which the current path is interrupted within each AC half cycle, the variation of the average interruption time of the switching means being such as to change the shape of the AC output waveform relative to the AC input waveform, said switching means being arranged to allow the passage of current for a multiplicity of pulses in each half cycle, said pulse duty cycle being fixed over one portion of each half cycle and being variable over another portion.

12. A dimmer assembly according to claim 11 in which said one portion extends between a zero crossing point of each half cycle and a desired phase angle, a transition period extends from the desired phase angle to the said other period which extends for the remainder of the half cycle, the pulse duty cycle varying between a maximum of the desired phase angle and substantially zero during the transition period.

13. A dimmer assembly according to claim 12 in which the variation of pulse duty cycle during the transition period is monotonic and during said one and another periods is fixed.

14. A dimmer assembly according to claim 12 wherein the variation of pulse duty cycle during said portion is such as to shape the wave form at the output terminals during said transition period to follow a predetermined low frequency curve shape.

15. A dimmer assembly comprising AC input terminals, AC output terminals, switching means arranged to interrupt the AC current path between the input terminals and the output terminals a multiplicity of times throughout an entire AC half mains cycle, switch driving means arranged to vary the average time for which the current path is interrupted within each AC half cycle, the variation of the average interruption time of the switching means being such as to change the shape of the AC output waveform relative to the AC input waveform, said AC output waveform being shaped to avoid significant discontinuities in the rate of change of voltage at the time.

16. A method of supplying power to a lamp comprising interrupting an AC mains waveform a multiplicity of times over a complete half cycle, the duty cycle of the interruptions being variable across the half cycle, and smoothing the interrupted waveform so as to reduce the high frequency energy in the waveform, so as to provide an output waveform to the lamp of different shape to the input waveform.

17. A method of supplying power to a lamp comprising interrupting an AC mains waveform a multiplicity of times over a complete half cycle, the duty cycle of the interruptions being variable across the half cycle, and smoothing the interrupted waveform so as to reduce the high frequency energy in the waveform, so as to provide an output waveform to the lamp of different shape to the input waveform, said waveform being interrupted, on average, for a greater portion of the peak amplitude portions thereof so as to provide peaks of reduced amplitude in the power supply to the lamp.

18. A method of supplying power to a lamp comprising interrupting an AC mains waveform a multiplicity of times over a complete half cycle, the duty cycle of the interruptions being variable across the half cycle, and smoothing the interrupted waveform so as to reduce the high frequency energy in the waveform, so as to provide an output waveform to the lamp of different shape to the input waveform, said method including providing interruptions of monotonically varying duty cycle so as to produce in the output waveform a smooth transition between an amplitude corresponding to a desired phase value and substantially zero amplitude over a period sufficiently long to substantially attenuate harmonic generation.

19. A method according to claim 18 in which the transition occurs after a substantially zero amplitude period, so as to provide forward phase control or the transition occurs after reaching said desired phase value so as to provide reverse phase control.

20. A method of supplying power to a lamp comprising interrupting an AC mains waveform a multiplicity of times over a complete half cycle, the duty cycle of the interruptions being variable across the half cycle, and smoothing the interrupted waveform so as to reduce the high frequency energy in the waveform, so as to provide an output waveform to the lamp of different shape to the input waveform, said first and second derivatives of the interruption duty cycle, over time within each cycle being both substantially smooth so as to reduce harmonic generation.

21. A dimmer comprising high frequency interruption of an AC power supply to attenuate peak amplitude levels of the power supply so as to produce an output voltage wave form of lower peak amplitude for given RMS power than the input waveform.

22. A dimmer comprising means for varying duty factor interruptions in an AC power supply waveform to produce an AC output waveform having phase control with actively controlled power transitions to zero.

23. A dimmer comprising means for varying duty factor interruptions in an AC power supply waveform to produce an AC output waveform having phase control with actively controlled power transitions to zero; and means for shaping the input AC waveform by interrupting the waveform a multiplicity of times within each half cycle with a varying duty factor across each half cycle.

* * * * *